US010685570B2

(12) United States Patent
Son et al.

(10) Patent No.: US 10,685,570 B2
(45) Date of Patent: Jun. 16, 2020

(54) ELECTRONIC DEVICE FOR IDENTIFYING EXTERNAL VEHICLE WITH CHANGED IDENTIFICATION INFORMATION BASED ON DATA RELATED TO MOVEMENT OF EXTERNAL VEHICLE AND METHOD FOR OPERATING THE SAME

(71) Applicant: Samsung Electronics Co., Ltd., Gyeonggi-do (KR)

(72) Inventors: Dong-Il Son, Gyeonggi-do (KR); Jong-Sung Joo, Seoul (KR); Sun-Min Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/039,649

(22) Filed: Jul. 19, 2018

(65) Prior Publication Data
US 2019/0035277 A1    Jan. 31, 2019

(30) Foreign Application Priority Data
Jul. 25, 2017  (KR) .......................... 10-2017-0094287

(51) Int. Cl.
*G08G 1/16* (2006.01)
*G08G 1/0965* (2006.01)
(Continued)

(52) U.S. Cl.
CPC .......... *G08G 1/163* (2013.01); *G08G 1/0965* (2013.01); *G08G 1/162* (2013.01); *G08G 1/164* (2013.01);
(Continued)

(58) Field of Classification Search
CPC ........ G08G 1/162; G08G 1/163; G08G 1/164; G08G 1/16; G08G 1/0965; G07C 1/10;
(Continued)

(56) References Cited

U.S. PATENT DOCUMENTS 8,884,781 B2 * 11/2014 Yuse .................. G01C 21/3691
340/902
9,293,044 B2 * 3/2016 Chen ................ G08G 1/096716
(Continued)

Primary Examiner — Hoi C Lau
(74) Attorney, Agent, or Firm — Cha & Reiter, LLC.

(57) ABSTRACT

According to an embodiment, an electronic device may include a communication module and a processor configured to receive, from one or more first external vehicles through the communication module, one or more pieces of first identification information and first data related to movement of the one or more first external vehicles, receive, from one or more second external vehicles through the communication module, one or more pieces of second identification information and second data related to movement of the one or more second external vehicles a designated time period after receiving the first identification information and the first data, identify at least one piece of non-received identification information among the one or more pieces of first identification information, which is not included in the one or more pieces of second identification information, and at least one piece of newly received identification information among the one or more pieces of second identification information, which is not included in the first identification information, identify an external vehicle of which identification information is changed, the external vehicle corresponding to the at least one piece of non-received identification information, and the identifying is based on, at least, data corresponding to the at least one piece of newly received identification information among the second data and data corresponding to the at least one piece of non-received identification information among the first data, and associate data corresponding to the external vehicle of which identification information is changed among the first data (Continued)

and data corresponding to the external vehicle of which identification information is changed among the second data as data related to the movement of the external vehicle of which identification information is changed.

11 Claims, 17 Drawing Sheets

(51) Int. Cl.
 *H04W 4/40* (2018.01)
 *H04W 4/02* (2018.01)
 *H04W 4/46* (2018.01)

(52) U.S. Cl.
 CPC ............. *H04W 4/025* (2013.01); *H04W 4/40* (2018.02); *H04W 4/46* (2018.02)

(58) Field of Classification Search
 CPC ........... H04W 4/40; H04W 4/02; H04W 4/46; H04W 4/025
 See application file for complete search history.

(56) References Cited

U.S. PATENT DOCUMENTS

| | | | |
|---|---|---|---|
| 9,990,844 B2* | 6/2018 | Park | G08G 1/0112 |
| 10,354,333 B1* | 7/2019 | Hayward | G01C 21/3655 |
| 2011/0128139 A1* | 6/2011 | Tauchi | B60K 35/00 340/439 |
| 2012/0268295 A1* | 10/2012 | Yuse | G08G 1/0104 340/905 |
| 2013/0154853 A1* | 6/2013 | Chen | G08G 1/096716 340/905 |
| 2014/0358414 A1* | 12/2014 | Ibrahim | G01C 21/10 701/118 |
| 2015/0054659 A1* | 2/2015 | Chen | G08G 1/096716 340/905 |
| 2016/0140842 A1* | 5/2016 | Park | G08G 1/0112 340/905 |
| 2016/0232785 A1* | 8/2016 | Wang | G08G 1/012 |

* cited by examiner

| | | IDENTIFICATION INFORMATION | POSITION | SPEED | HEADING | PECULIARITY | |
|---|---|---|---|---|---|---|---|
| 560 | $t_1$ | V1 | $(a_1,b_1,c_1)$ | S1 | θ1 | RECKLESS DRIVING | 561 |
| | | V2 | $(a_2,b_2,c_2)$ | S2 | θ2 | HARD BRAKING | 562 |
| | | P1 | $(a_3,b_3,c_3)$ | S3 | θ3 | – | 563 |
| 570 | $t_2$ | V1 | $(a_4,b_4,c_4)$ | S4 | θ1 | RECKLESS DRIVING | 571 |
| | | V2 | $(a_5,b_5,c_5)$ | S2 | θ2 | HARD BRAKING | 572 |
| | | P1 | $(a_6,b_6,c_6)$ | S5 | θ3 | | 573 |

ELECTRONIC DEVICE FOR IDENTIFYING EXTERNAL VEHICLE WITH CHANGED IDENTIFICATION INFORMATION BASED ON DATA RELATED TO MOVEMENT OF EXTERNAL VEHICLE AND METHOD FOR OPERATING THE SAME

CROSS-REFERENCE TO RELATED APPLICATION(S)

This application is based on and claims priority under 35 U.S.C. § 119 to Korean Patent Application No. 10-2017-0094287, filed on Jul. 25, 2017, in the Korean Intellectual Property Office, the disclosure of which is incorporated by reference herein in its entirety.

BACKGROUND

Field

Various embodiments of the disclosure generally relate to electronic devices for receiving communication signals from vehicles and methods for operating the same.

Description of Related Art

Recently developed technologies allow cars or other vehicles to communicate with other entities. Vehicles may be equipped with a communication circuit and may send various pieces of information, such as speed, steered direction, and whether brakes are applied, etc., through the communication circuit to other entities. For example, a vehicle may send information to another vehicle and receive information from the other vehicle. Such inter-vehicle communication may be called vehicle-to-vehicle (V2V) communication. In another example, vehicles may transmit information to road side units (RSUs) and receive information from the RSUs. Such vehicle-to-RSU communication may be termed vehicle-to-infrastructure (V2I) communication. In still another example, vehicles may transmit information to pedestrians' electronic devices and receive communication signals including safety-related information from the electronic devices. The communication between vehicles and pedestrians' electronic devices may be referred to as vehicle-to-pedestrian (V2P) communication. Pedestrians' electronic devices (e.g., smartphones or wearable electronic devices) may obtain various pieces of information such as their speed, position, or whether they are in a crosswalk, and send the information to vehicles. Pedestrians' electronic devices may also transfer obtained information to RSUs and share information received from RSUs with vehicles. Vehicles may control their driving as per received information, ensuring pedestrians' safety.

A vehicle may transmit communication signals including driving-associated information. The communication signals may contain information for identifying the vehicle. A pedestrian's electronic device may send communication signals associated with her safety. The communication signals may include information for identifying the electronic device. The vehicle or the electronic device may change the identification information after using the information for a predetermined time, and thus, protecting the privacy of the pedestrians and the drivers. However, such change in identification information may cause misidentification of the vehicles and the electronic devices.

The above information is presented as background information only to assist with an understanding of the disclosure. No determination has been made, and no assertion is made, as to whether any of the above might be applicable as prior art with regard to the disclosure.

SUMMARY

According to various embodiments of the disclosure, there may be provided an electronic device that, upon receiving identification information different from prior identification information that it received, determines that the received identification information and the prior identification information indicate the same object if a designated condition is met. A method for operating the electronic device is also disclosed herein.

According to an embodiment, an electronic device may comprise a communication module and a processor configured to receive, from one or more first external vehicles through the communication module, one or more pieces of first identification information and first data related to movement of the one or more first external vehicles, receive, from one or more second external vehicles through the communication module, one or more pieces of second identification information and second data related to movement of the one or more second external vehicles a designated time period after receiving the first identification information and the first data, identify at least one piece of non-received identification information among the one or more pieces of first identification information, which is not included in the one or more pieces of second identification information, and at least one piece of newly received identification information among the one or more pieces of second identification information, which is not included in the first identification information, identify an external vehicle of which identification information is changed, the least one external vehicle corresponding to the at least one piece of non-received identification information, and the identifying is based on, at least, data corresponding to the at least one piece of newly received identification information among the second data and data corresponding to the at least one piece of non-received identification information among the first data, and associate data corresponding to the external vehicle of which identification information is changed among the first data and data corresponding to the external vehicle of which identification information is changed among the second data as data related to the movement of the external vehicle of which identification information is changed.

According to an embodiment, a method for operating an electronic device may comprise receiving, from one or more first external vehicles, one or more pieces of first identification information and first data related to movement of the one or more first external vehicles, receiving, from one or more second external vehicles, one or more pieces of second identification information and second data related to movement of the one or more second external vehicles a designated time period after receiving the first identification information and the first data, identifying at least one piece of non-received identification information among the one or more pieces of first identification information, which is not included in the one or more pieces of second identification information, and at least one piece of newly received identification information among the one or more pieces of second identification information, which is not included in the first identification information, identifying an external vehicle of which identification information is changed, the external vehicle corresponding to the at least one piece of non-received identification information, and the identifying is based at least on data corresponding to the at least one piece of newly received identification information among the second data and data corresponding to the at least one piece of non-received identification information among the first data, and associating data corresponding to the external vehicle of which identification information is changed among the first data and data corresponding to the external vehicle of which identification information is changed among the second data as data related to the movement of the external vehicle of which identification information is changed.

According to an embodiment, an electronic device may comprise a display device, a communication module, and a processor configured to provide, through the display device, a first content indicating at least one of a position and a movement, at a first time, of an external electronic device, generated based on at least part of first data received along with first identification information from the external electronic device through the communication module and provide, through the display device, a second content indicating at least one of a position and a movement, at a second time, of the external electronic device, generated based on at least part of the first data and at least part of second data received along with second identification information, different from the first identification information, from the external electronic device through the communication module.

According to an embodiment, an electronic device may comprise a communication module and a processor configured to transmit, through the communication module, a communication signal including identification information and at least one of position and movement information about the electronic device, update the identification information in a designated default update period, and upon detecting an update period adjusting event, update the identification information in the update period corresponding to the update period adjusting event.

According to an embodiment, an electronic device may comprise a communication module and a processor configured to transmit, through the communication module, a communication signal including identification information and at least one of position and movement information about the electronic device, update the identification information in a designated default update period, upon receiving a communication signal instructing to fix the identification information through the communication module, stop updating the identification information, and upon receiving a communication signal to unfix the identification information through the communication module, update the identification information in the designated default update period.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily understood by reference to the following detailed description when considered in connection with the accompanying drawings, wherein.

Throughout the drawings, like reference numerals will be understood to refer to like parts, components, and structures.

DETAILED DESCRIPTION

Figure 1:
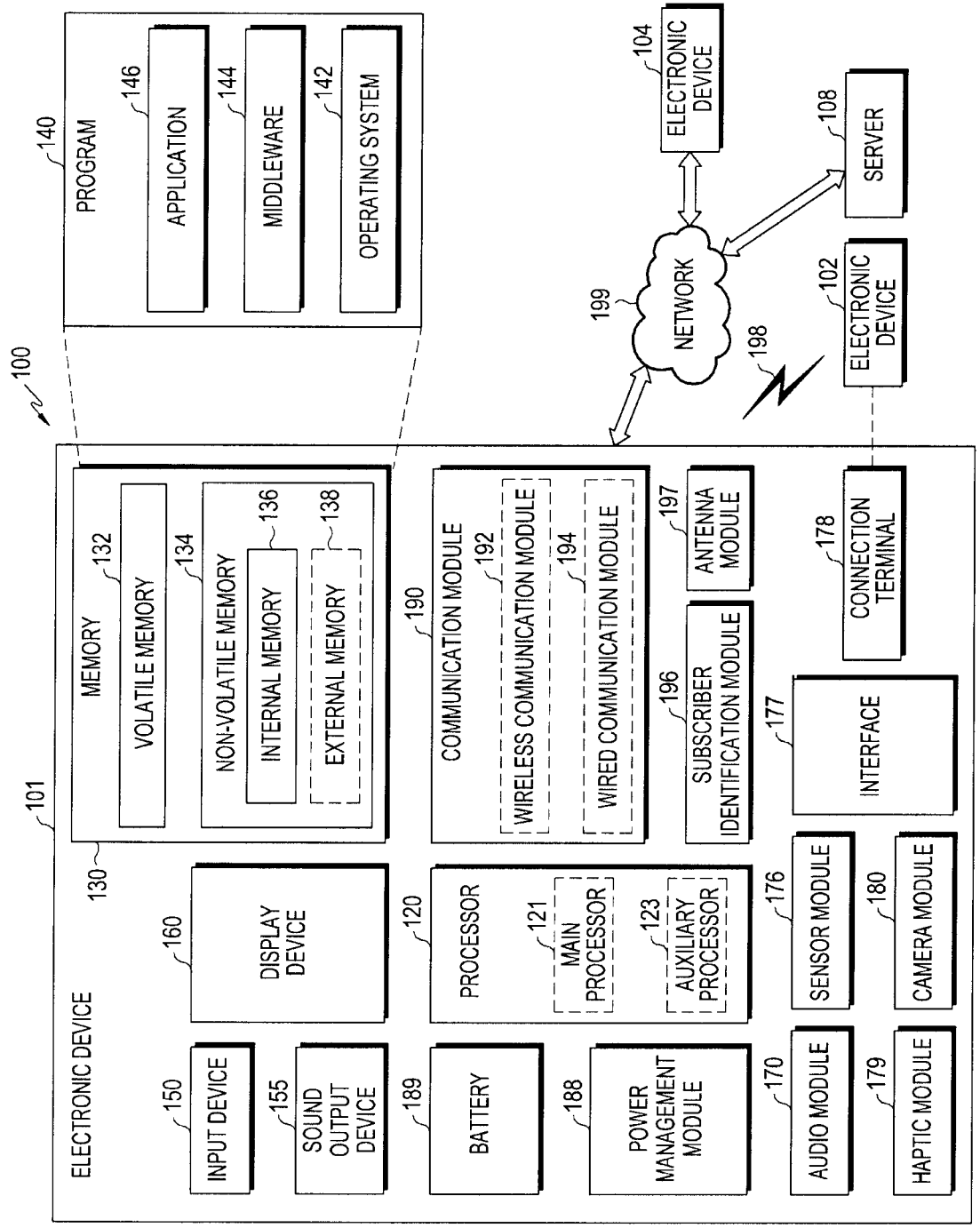
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) via a wire or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
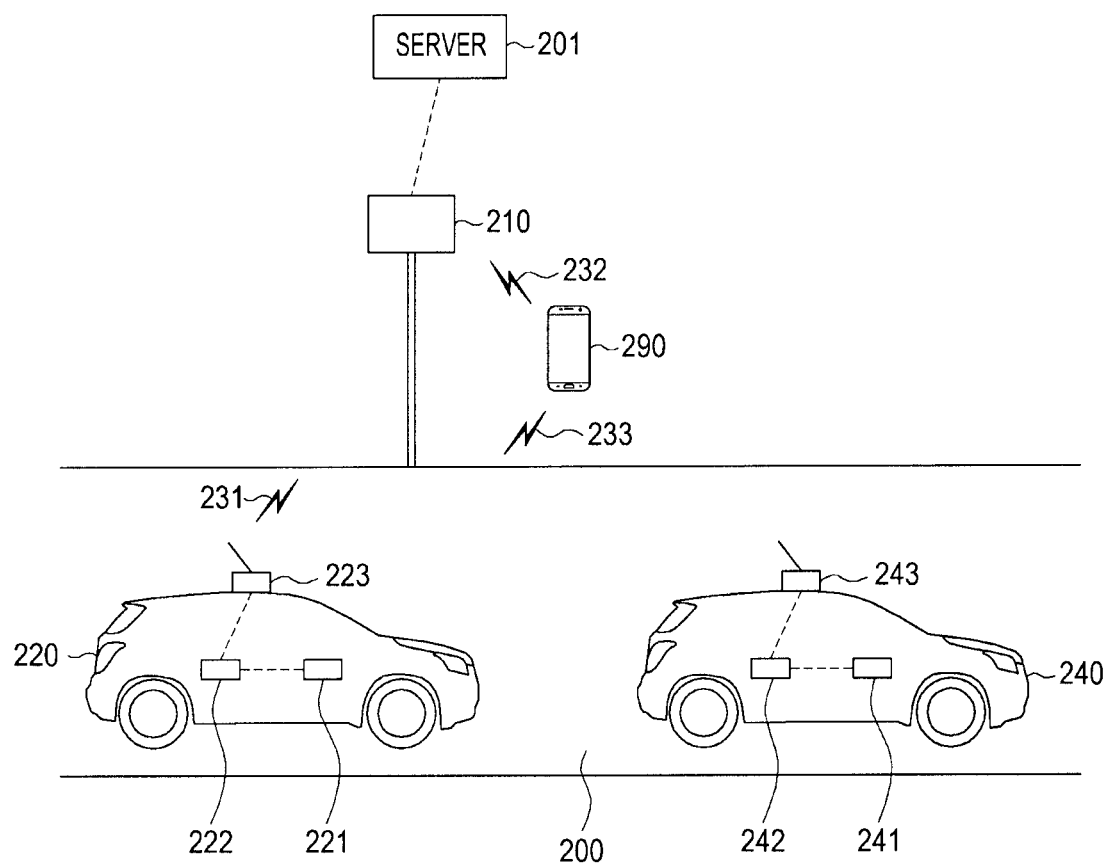
FIG. 2 is a view illustrating an electronic device, a vehicle, and an RSU according to an embodiment.

FIG. 2 is a view illustrating an electronic device, a vehicle, and an RSU according to an embodiment.

Referring to FIG. 2, at least one vehicle 220 or 240 may be positioned in a road 200. A road side unit (RSU) 210 may be positioned one a side of the road 200. The vehicle 220 may include a terminal platform 221, a vehicle communication module 222, and an antenna 223. The vehicle 240 may include a terminal platform 241, a vehicle communication module 242, and an antenna 243. The vehicle 220 may include at least part of, e.g., the electronic device 101 of FIG. 1 in which case the terminal platform 221 may include the processor 120, and the vehicle communication module 222 may include the communication module 190. As used herein, "vehicle 220 performs a particular operation" may mean that the electronic device 101 (e.g., the processor 120) performs the particular operation or other hardware is configured to perform the particular operation under the control of the processor 120 or that the memory 130 stores instructions to enable the processor 120 to perform the particular operation. The terminal platform 221 or 241 may control various operations of the vehicle 220 or 240 and obtain various pieces of information associated with the vehicle 220 or 240. For example, the vehicle 220 or 240 may receive measurement data from various sensors such as a speedometer (not shown), an accelerometer (not shown), a heading indicator (not shown), a brake detector (not shown), a position meter (e.g., a global positioning system (GPS) module) (not shown), or a road surface state detector (not shown). The vehicle 220 or 240 (e.g., the terminal platform 221 or 241) may generate data to be transmitted (referred to hereinafter as the "transmit data") based on the received measurement data. In addition, the terminal platform 221 or 241 may generate transmit data based on information contained in a memory (not shown) of the vehicle 220 or 240 (e.g., identification information about the vehicle 220 or 240 or information related to the size or capability of the vehicle 220 or 240). For example, the vehicle communication module 222 may generate a signal corresponding to a communication signal using the transmit data and provide the signal to the antenna 223. The antenna 223 may transmit the communication signal 231 to a nearby entity (e.g., the RSU 210, a mobile terminal device 290 or the other vehicle 240) using the received signal. The communication signal 231 may contain various pieces of information such as the speed, acceleration, or heading of the vehicle 220, whether the brake of the vehicle 220 is applied, or road surface detection information. For example, the vehicle 220 may transmit the communication signal 231 as defined in wireless access in vehicular environments (WAVE) standards and adopt a frequency band of which center frequency is 5.8 GHz. For example, the vehicle 220 may include, in the communication signal 231, a message set associated with applications to implement a WAVE scheme and the relevant Society of Automotive Engineers (SAE) standard (e.g., a basic safety message (BSM) as defined in document J2735) specifying the data frame and data elements and transmit the communication signal 231. The BSM may include information associated with the position of the vehicle 220 (e.g., latitude, longitude, altitude, or positioning accuracy), movement-associated information (e.g., speed, heading, steering wheel angle, acceleration set, control information (e.g., brake state), or basic information (e.g., Part 1 information) about the basic transportation means (e.g., size of transportation means)), and in some cases, the BSM may include additional information (e.g., Part 2 information). The type of information contained in the BSM is merely an example and may be varied as different standards are used in a system according to the present disclosure. According to an embodiment, the vehicle 220 may transmit the communication signal containing the BSM or a message that is at least partially different from the BSM.

According to an embodiment, the vehicle 220 may include identification information about the vehicle 220 in the BSM. The identification information contained in the BSM may be varied after it is used for a predetermined time. For privacy protection, the vehicle 220 may vary the identification information contained in the BSM after using the identification information for a predetermined time. Thus, the mobile terminal device 290, the RSU 210, or the vehicle 240, which receives a first communication signal containing first identification information from the vehicle 220, may later receive a second communication signal containing second identification information from the vehicle 220. The mobile terminal device 290 may be an electronic device that a pedestrian is carrying and may include at least part of, e.g., the electronic device 101 of FIG. 1. As used herein, "mobile terminal device 290 performs a particular operation" may mean that the electronic device 101 (e.g., the processor 120) performs the particular operation or other hardware is configured to perform the particular operation under the control of the processor 120 or that the memory 130 stores instructions to enable the processor 120 to perform the particular operation. The mobile terminal device 290, the RSU 210, or the vehicle 240 may allow the second identification information to correspond to the first identification information. In other words, the mobile terminal device 290, the RSU 210, or the vehicle 240 may identify that the second identification information and the first identification information both indicate the same vehicle 220. For example, the mobile terminal device 290, the RSU 210, or the vehicle 240 may determine that the second identification information is updated identification information of the first identification information based on at least first information (e.g., position or speed) contained in the first control signal and second information (e.g., position or speed) contained in the second communication signal. The mobile terminal device 290, the RSU 210, or the vehicle 240 may associate the second information contained in the second control signal to the first information and manage the pieces of information together, which is described below in greater detail. The vehicle 220 may transmit the communication signal 231 based on the transmission period, frequency, or strength defined in the relevant standards, but this is merely an example. It will readily be appreciated by one of ordinary skill in the art that there is no specific limitation to conditions (e.g., transmission period, transmission frequency, or transmission strength) for the vehicle 220 to transmit the communication signal 231. Normally, the vehicle 220 may transmit the communication signal 231 containing the BSM. But alternatively, the vehicle 220 may include, in the communication signal 231, various other messages, such as a common safety request (CSR), an emergency vehicle alert (EVA), or an intersection collision avoidance (ICA), and transmit the communication signal 231. The communication signal 231 transmitted through the antenna 223 may further include a contextual awareness message (CAM) as per the standard applied to the vehicle 220. The vehicle 220 may broadcast, unicast, or multicast the communication signal 231 to the other vehicle 240, RSU 210, or electronic device 101 through the antenna 223. At least one of the terminal platform 221, the vehicle communication module 222, or the antenna 223 in the vehicle 220 may also be referred to as an onboard unit (OBU).

The RSU 210 may receive the communication signal 231 from the vehicle 220 and extract information from the received communication signal 231. The RSU 210 may be positioned on a side of the road 200 where pedestrians' safety is called for, such as a crosswalk, near a traffic signal, near an intersection, or where the likelihood of an accident by the vehicle 220 is relatively high. The RSU 210 may be disposed in a way that a shadow zone does not exist. The RSU 210 may include in the communication signal 232 at least one of the information received from the vehicle 220 and a result of analysis of the received information and broadcast the communication signal 232. Alternatively, the RSU 210 may transmit at least one of the received information and a result of analysis of the received to a server 201. The server 201 may manage the RSU 210, gather vehicle information or traffic information, or provide traffic video information. The RSU 210 may determine various circumstances (e.g., accidents, vehicle failure, or dangers that vehicles or pedestrians are in) based on information from the vehicle 220 and transmit the communication signal 232 containing the determined circumstances to a vehicle (e.g., the vehicle 220 or 240) or the mobile terminal device 290. The RSU 210 may broadcast, unicast, or multicast, to ambient entities, communication signals 232 containing at least one of identification information about the RSU 210, position information about the RSU 210, information associated with nearby vehicles, and information associated with nearby pedestrians. The RSU 210 may also send alert information depending on the determined circumstances. The RSU 210 may control features (e.g., a traffic light) located in the traffic zone according to the received information.

The pedestrian carrying the mobile terminal device 290 may be on a side of the road 200. The mobile terminal device 290 may obtain information (e.g., position, speed, heading, acceleration, route history information, information about whether the pedestrian is on board a vehicle, pedestrian behavior information, information about crossing in the crosswalk, information about the size of a pedestrian cluster, task-related information, defect-related information, pedestrian-related information, or information about the entity attached to the pedestrian) and transmit a control signal 233 containing the obtained information to the vehicle 220 or 240 or RSU 210. The mobile terminal device 290 may generate the communication signal 233 using information obtained through various sensors (e.g., the sensor module 176) that it has, information obtained through the input device 150, information obtained through touch circuitry included in the display device 160, or information obtained through the communication module 190. For example, the mobile terminal device 290 may include in the communication signal 233 a personal safety message (PSM) as defined in the SAE standards (e.g., document J2735) and transmit the communication signal 233. The PSM may contain, e.g., user type information (e.g., unavailable, pedestrian, pedal cyclist, public safety worker, or animal). The PSM may contain, e.g., time stamp information about the time at which the message is generated. The PSM may contain, e.g., message count information indicating the number of messages generated from the object which has generated the message. The PSM may contain, e.g., identification information (e.g., fixed or dynamic identifier) for communication. The PSM may contain, e.g., information (e.g., at least one of latitude, longitude, and altitude) about the position of the mobile terminal device 290. This information may be denoted in world geopetic system (WGS) units (e.g., cm, 1/10 micro degree, or 1/10 micro degree).

However, the present disclosure is not limited thereto, and the information may be denoted in any other units that may represent three-dimensional (3D) positions. The PSM may contain, e.g., accuracy information about the position of the mobile terminal device 290. The PSM may contain, e.g., speed information. The PSM may contain, e.g., heading information. The WAVE standards may designate the above-enumerated information as essential information that should be included in the PSM. However, according to an embodiment, the mobile terminal device 290 may transmit communication signals that lack at least some of the above-listed types of information. In other words, according to an embodiment, there is no limitation as to the information contained in communication signals that the mobile terminal device 290 sends. Meanwhile, the PSM may add, e.g., per-axis acceleration information. The PSM may contain, e.g., history information about the route along which the mobile terminal device 290 traveled. The PSM may include, e.g., propulsion type information (e.g., whether the mobile terminal device 290 is propelled due to human, animal, or vehicle). The PSM may include, e.g., use state information. The use state information may indicate information associated with the current operation that the mobile terminal device 290. Use state parameters may include at least one parameter such as unavailable, other, idle, listening to audio, typing, calling, playing game, reading, or viewing. Reading may be a state in which e-book content, web browser content, or other content for which screen change over time is relatively infrequent is displayed. Viewing may be a state in which content for which screen change over time is relatively frequent, e.g., video, is displayed. The mobile terminal device 290 may determine the use state of the mobile terminal device 290 based on, e.g., the type of content being currently displayed, whether audio is now being output, the type of application now running, or whether there is an input through the input device. The PSM may include, e.g., information indicating whether the mobile terminal device 290 has sent a request regarding crossing in the crosswalk or whether the pedestrian is crossing in the crosswalk. The PSM may include, e.g., cluster size information. The PSM may include, e.g., event responder type information (e.g., tow operator, emergency medical service worker, department of transport worker, law enforcement worker, hazmat responder, or animal control worker). The PSM may include, e.g., activity type information (e.g., police, traffic control manager, soldier, or emergency manager). The PSM may include, e.g., assist type (e.g., pedestrian's handicap information such as visual impairment, hearing impairment, physical disability, or mental impairment). The PSM may include, e.g., sizing information (e.g., whether adult or child, or whether small enough to be hidden by ambient terrain feature). The PSM may include, e.g., attachment information (e.g., stroller, cart, or wheelchair). Although described below in greater detail, the attachment information may also include information about the position of the vehicle that the mobile terminal device 290 has been seated in. The PSM may include, e.g., information about the size of the attachment. The PSM may include, e.g., animal type information (e.g., guide dog). The types of information contained in the PSM are merely examples and may be varied as different standards are applied to the system of the present disclosure. According to an embodiment, the mobile terminal device 290 may transmit communication signals 233 containing the PSM or other messages that are at least partially different from the PSM. The mobile terminal device 290 may send the communication signal 233 based on the transmission period, frequency, or strength defined in the relevant standards, but this is merely an example. It will readily be appreciated by one of ordinary skill in the art that there is no limitation to the conditions for the mobile terminal device 290 to send the communication signal 233 (e.g., transmission period, transmission frequency, or transmission strength). The mobile terminal device 290 may broadcast, unicast, or multicast communication signals 233 to the vehicle 220 or the RSU 210.

According to an embodiment, the mobile terminal device 290 may include the identification information about the electronic device 101 in the PSM. The identification information contained in the PSM may be changed after it is used for a predetermined time. The mobile terminal device 290 may change the identification information contained in the PSM after a predetermined time elapses for privacy purposes. Thus, the RSU 210 or the vehicle 220 or 240, which receives a first communication signal containing first identification information from the mobile terminal device 290, may later receive a second communication signal containing second identification information from the mobile terminal device 290. The RSU 210 or the vehicle 220 or 240 may determine that the second identification information corresponds to the first identification information, i.e. the two identification information identify the same entity. For example, the RSU 210 or the vehicle 220 or 240 may determine that the second identification information is updated identification information of the first identification information based on at least first information (e.g., position or speed) contained in the first control signal and second information (e.g., position or speed) contained in the second communication signal. The RSU 210 or the vehicle 220 or 240 may associate the second information contained in the second control signal to the first information and manage the pieces of information together, which is described below in greater detail.

According to an embodiment, the mobile terminal device 290 may be configured to transmit the communication signal 233 when a designated condition is met. Unless the designated condition is met, the mobile terminal device 290 may abstain from transmitting the communication signal 233, thus saving battery power. For example, upon determining that the current position of the mobile terminal device 290 is in a predesignated area, the mobile terminal device 290 may transmit the communication signal 233 containing the PSM. The RSU 210 may transmit pedestrian-related information to nearby vehicles, and nearby vehicles may use the information to provide safety for the pedestrians. In other words, the vehicle 220 or 240 may directly receive the communication signal 233 from the mobile terminal device 290 and use the information contained in the communication signal 233 control the operations of the vehicle 220 or 240 so that the safety of the pedestrians is ensured.

Meanwhile, the mobile terminal device 290 may be placed in the vehicle 220 while being carried by the user. In some cases, the vehicle 220 have no WAVE communication module. In this case, the mobile terminal device 290 may be operated as an OBU and may generate a communication signal (e.g., a BSM-containing communication signal) corresponding to the vehicle 220 using at least one of information obtained by the mobile terminal device 290, information received from the vehicle where it is placed, and information entered by the user. The mobile terminal device 290 may transmit the BSM-containing communication signal and may process the BSM received from the other vehicle 240. The mobile terminal device 290 may output content associated with at least one of the position and movement of the other vehicle 240. The mobile terminal device 290 may control the driving of the vehicle 220 based on at least one of the position and movement of the other vehicle 240. The mobile terminal device 290 may determine that the mobile terminal device 290 is placed inside the vehicle 220 by various methods. Thus, the mobile terminal device 290 may determine that the vehicle 220 does not support inter-vehicle communication (e.g., WAVE communication), and the mobile terminal device 290 may transmit communication signals containing information associated with the driving of the vehicle.

Figure 3A:
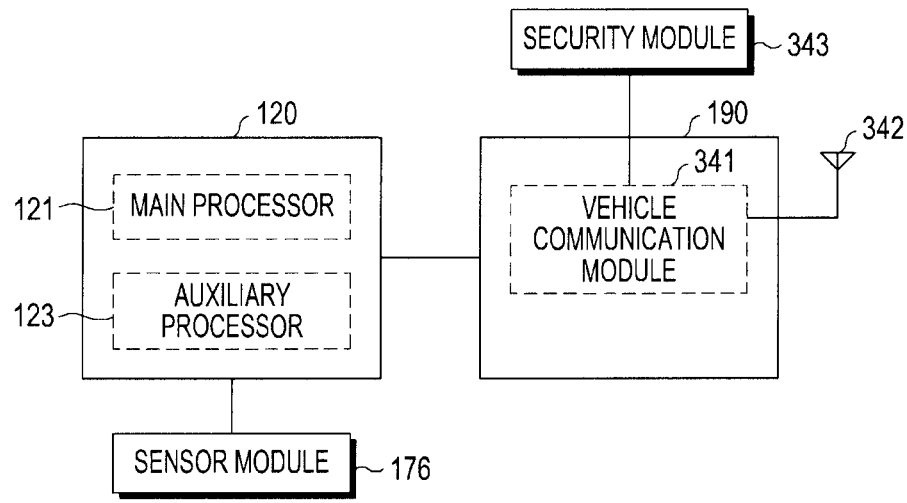
FIG. 3A is a block diagram illustrating an electronic device according to an embodiment.

FIG. 3A is a block diagram illustrating an electronic device according to an embodiment.

Figure 3B:
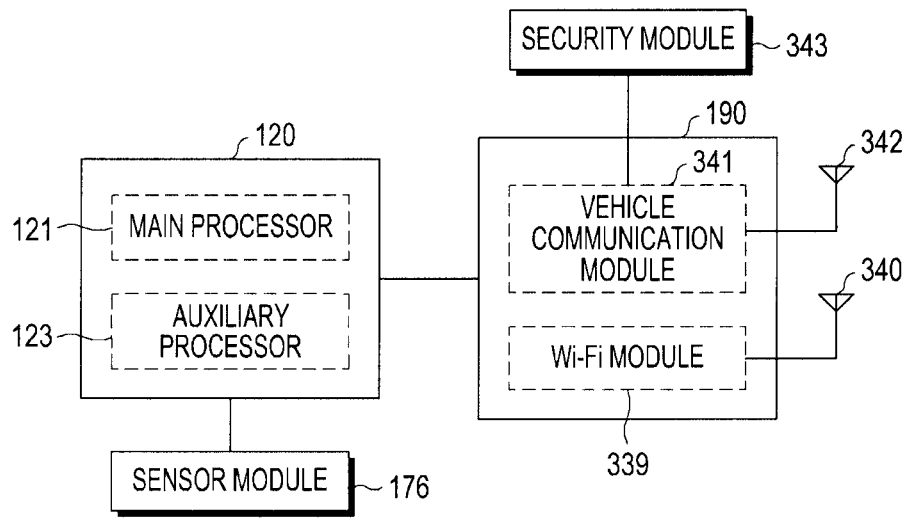
FIG. 3B is a block diagram illustrating an electronic device according to another embodiment.

FIG. 3B is a block diagram illustrating an electronic device according to another embodiment.

Figure 3C:
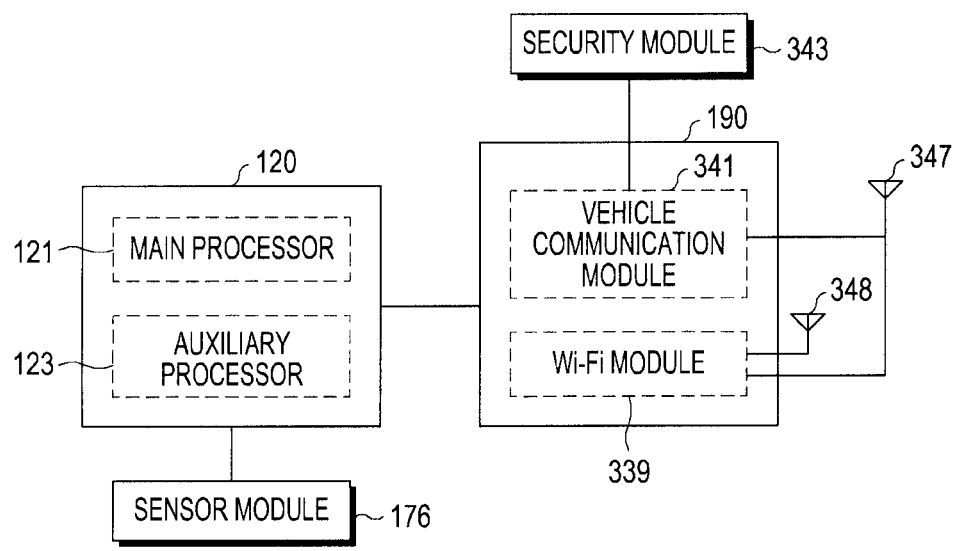
FIG. 3C is a block diagram illustrating an electronic device according to yet another embodiment.

FIG. 3C is a block diagram illustrating an electronic device according to yet another embodiment.

Referring to FIG. 3A, a communication module 190 may include a vehicle communication module 341. The vehicle communication module 341 may be connected to an antenna 342 to enable vehicle communication. The antenna 342 for the vehicle communication module may be included in, e.g., the antenna module 197. The electronic device 101 may include a security module 343. As set forth above, the electronic device 101 may be included in the vehicle 220 or 240 or the mobile terminal device 290. The processor 120 (e.g., the main processor 121) may control the overall operation of the electronic device 101. For example, as an instruction stored in the memory 130 is executed, the processor 120 may control at least one piece of hardware to perform the operation corresponding to the instruction. The main processor 121 (e.g., an application processor (AP)) may operate according to a sleep mode or a wake-up mode. In the sleep mode, the main processor 121 may perform no operation, thus consuming less battery power. The main processor 121 may be triggered under various conditions to switch into the wake-up mode. In the wake-up mode, the main processor 121 may operate as per instructions stored in the memory 130. The main processor 121 may determine information related to the driving of other vehicles based on information included in the communication signal received through the communication module 190. The main processor 121 may store information related to the driving of other vehicles in the memory 130. Where the identification information about the other vehicles is updated, the main processor 121 may allow the prior identification information to correspond to new identification information, i.e., the updated identification information, and associate the data corresponding to the prior information to the data corresponding to the new identification information. The main processor 121 may obtain various pieces of information, such as data obtained from various sensors included in the sensor module 176, e.g., an acceleration sensor, gyro sensor, or geo-magnetic sensor, data obtained from a positioning device, such as a GPS module, or results of analysis of images obtained by the camera module 180. The main processor 121 may control the vehicle communication module 341 and the vehicle communication module antenna 342 to send communication signals containing the obtained information. Although not shown, a front end module (FEM) may be connected between the vehicle communication module 341 and the vehicle communication module antenna 342. Where the main processor 121 is in the sleep mode, an auxiliary processor 123 (e.g., a sensor hub processor) may perform the above-described operations of the main processor 121.

The vehicle communication module 341 may support WAVE communication schemes. For example, the vehicle communication module 341 may transmit communication signals containing the PSM or BSM through the vehicle communication module antenna 342. According to an embodiment, the electronic device 101 may be placed in the vehicle or the electronic device 101 may be electrically connected with the vehicle. In this case, the vehicle communication module 341 may transmit communication signals containing the BSM through the vehicle communication module antenna 342. The vehicle communication module 341 may receive a communication signal containing the BSM or PSM from another entity and provide the communication signal to the processor 120. The vehicle communication module 341 may process a communication signal (e.g., a communication signal containing the BSM from another vehicle) received from through the vehicle communication module antenna 342 and transfer the processed signal to the processor 120.

According to an embodiment, the vehicle communication module 341 may be implemented in a chip set capable of performing various communication schemes such as Wi-Fi communication or Bluetooth communication as well as the WAVE communication. For example, the vehicle communication module 341 may be implemented in a chip set capable of processing both Wi-Fi data and vehicle safety-related data (e.g., WAVE data). For example, the vehicle communication module 341 may be implemented in a chip set manufactured to be able to process data as per IEEE 802.11a/b/n/p. Further, the vehicle communication module antenna 342 may transmit and receive Wi-Fi communication signals and vehicle safety-related communication signals (e.g., WAVE communication signals). For example, the Wi-Fi communication signals may adopt a frequency band of which center frequency is 5 GHz, and the WAVE communication signals may adopt a frequency band of which center frequency is 5.8 GHz, allowing the vehicle communication module antenna 342 to transmit and receive the two types of communication signals. Although it is illustrated as if there is one vehicle communication module antenna 342, this is merely an example, and there may be provided a plurality of antennas as required in the communication standards supported by the electronic device. Where the vehicle communication module 341 supports multiple communication schemes, the vehicle communication module 341 may connect to the respective corresponding antennas of the plurality of communication schemes. Among the plurality of communication schemes, ones with similar frequencies (e.g., Wi-Fi communication of the 5 GHz band and WAVE communication of the 5.8 GHz band) may share an antenna. The security module 343 may store information required for WAVE data processing, and the vehicle communication module 341 or the processor 120 may process the WAVE data using the stored information. For example, the security module 343 may store various pieces of information such as information used for WAVE modulation/demodulation, information used for encryption/decryption, and information used for processing messages. The vehicle communication module 341 or the processor 120 may directly access the security module 343. The security module 343 may be implemented integrally with the memory 130 or in a different hardware component from the memory 130. According to various embodiments, the security module 343 may be included in the communication module 190 or the vehicle communication module 341. The vehicle communication module 341 may receive data from the main processor 121 or the auxiliary processor 123, process the data, generate a signal corresponding to the WAVE communication signal, and provide the signal to the vehicle communication module antenna 342. For example, where the main processor 121 is in the wake-up mode, the vehicle communication module 341 may receive data from at least one of the main processor 121 and the auxiliary processor 123. Where the main processor 121 is in the sleep mode, the vehicle communication module 341 may receive data from the auxiliary processor 123. The auxiliary processor 123 may include a processing circuit capable of obtaining and processing data from at least one of sensors (e.g., an acceleration sensor, gyro sensor, or geo-magnetic sensor) and GPS module. The auxiliary processor 123 may further include a storage circuit capable of transitorily or non-transitorily storing the data. The vehicle communication module 341 may include at least one of a processing circuit capable of processing WAVE communication signals, a transmitting circuit capable of transmitting communication signals, and a receiving circuit capable of receiving communication signals. The vehicle communication module 341 may perform scanning to receive communication signals in a designated cycle, analyze the communication signals, and may operate even when the main processor 121 is in the sleep mode. The vehicle communication module 341 may receive a communication signal, and when data contained in the communication signal meets a designated condition, the vehicle communication module 341 may wake up the main processor 121. The vehicle communication module 341 may include a transmitting circuit for transmitting communication signals and a receiving circuit for processing communication signals from another electronic device. The electronic device 101 may selectively activate the transmitting circuit or the receiving circuit. For example, the electronic device 101 may deactivate the transmitting circuit while activating the receiving circuit, so that the electronic device 101 may scan communication signals from other entities while not transmitting communication signals itself. In the disclosure, any module for performing communication may be referred to as a communication circuit.

Figures 5A, 5B:
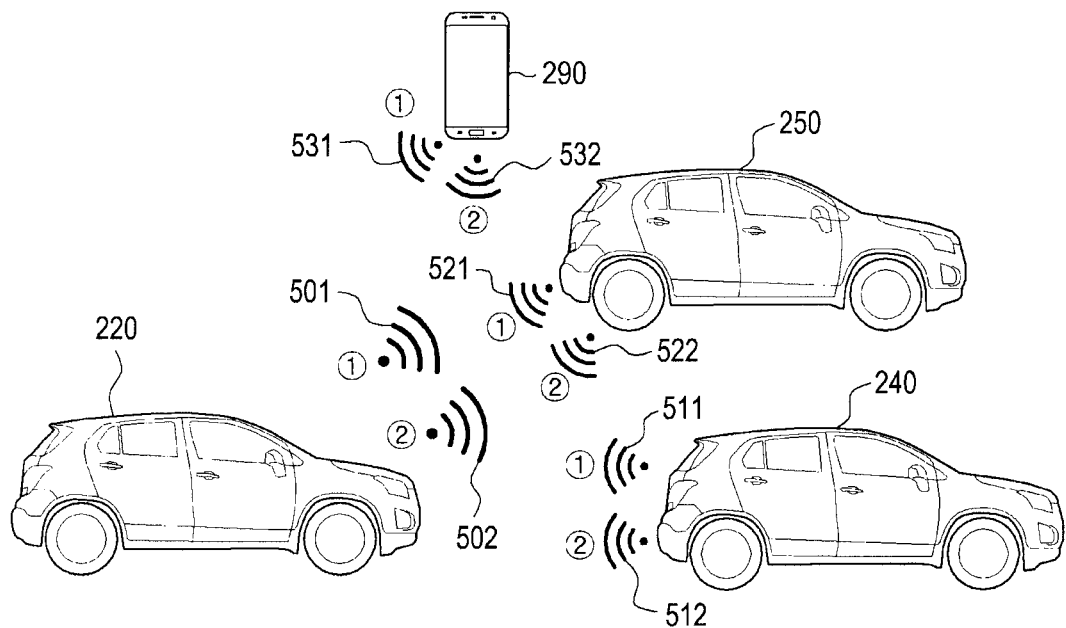
FIG. 5A is a view illustrating an electronic device and a vehicle according to an embodiment.
FIG. 5B is a table illustrating data managed by an electronic device according to an embodiment.

The processor 120 may receive a communication signal containing the BSM or PSM. Where the main processor 121 is in the sleep mode, the auxiliary processor 123 may process the BSM or PSM contained in the received communication signal and manage the information included therein. The auxiliary processor 123 or the vehicle communication module 341 may wake up the main processor 121 upon detecting that a designated condition is met. The processor 120 may manage the information corresponding to each of the identification information separately, as shown in FIG. 5B and described below. When the identification information is changed, the processor 120 may associate the data corresponding to the changed identification information with the data corresponding to the prior identification information. In one embodiment, if the electronic device 101 is not a portable device, for example is the electronic device 101 is permanently mounted in the vehicle 220, the electronic device 101 may not include the auxiliary processor 123 for low-power mode.

The processor 120 may display various graphic objects (e.g., graphic user interfaces (GUIs)) associated with vehicle safety on the display device 160. According to an embodiment, the processor 120 may display, on the display device 160, content indicating at least one of the movement and position of the other vehicle generated based on at least part of the information contained in the BSM received from the other vehicle. For example, the processor 120 may display, on the display device 160, content corresponding to the other vehicle along with a navigation execution screen. The audio module 170 may output vehicle-related alert voices. The camera module 180 may capture images. The processor 120 may determine whether to activate transmission or reception of WAVE communication signals using images received from the camera module 180. The acceleration sensor included in the sensor module 176 may sense the acceleration of the electronic device 101, the gyro sensor may sense rotational information, and the geo-magnetic sensor may sense geo-magnetic information. The processor 120 may include information in a communication signal (e.g., a PSM-containing communication signal) to be transmitted through the vehicle communication module 341 using data from various sensors (e.g., the acceleration sensor, gyro sensor, or geo-magnetic sensor) or the GPS module.

FIG. 3B is a block diagram illustrating an electronic device according to another embodiment. As compared with FIG. 3a, the communication module 190 of FIG. 3b may further include a Wi-Fi module 339. The Wi-Fi module 339 may be implemented in a chip set capable of performing Wi-Fi communication. The vehicle communication module 341 may be separately implemented in a chip set capable of performing, e.g., WAVE communication. Wi-Fi communication signals may be transmitted or received through a Wi-Fi antenna 340 connected with the Wi-Fi module 339, and WAVE communication signals (e.g., PSM-containing communication signals or BSM-containing communication signals) may be transmitted or received through the vehicle communication module antenna 342 connected with the vehicle communication module 341. According to an embodiment, the vehicle communication module 341 and the Wi-Fi module 339 may be connected to the antennas 340 and 342, respectively, as shown in FIG. 3B. Alternatively, the vehicle communication module 341 and the Wi-Fi module 339 may share one antenna.

FIG. 3C is a block diagram illustrating an electronic device according to yet another embodiment. Referring to FIG. 3c, the vehicle communication module 341 341 and the Wi-Fi module 339 of the electronic device 101 may share a first antenna 347, and the Wi-Fi module 339 may be connected to a second antenna 348. When the Wi-Fi module 339 performs first Wi-Fi communication on a 5 GHz band, the circuit for the first Wi-Fi communication of the Wi-Fi module 339 and the WAVE communication module may share the first antenna 347. Alternatively, when the Wi-Fi module 339 performs second Wi-Fi communication on a 2.4 GHz band, the circuit for the second Wi-Fi communication of the Wi-Fi module 339 may be connected to the second antenna 348 (e.g., the antenna for 2.4 GHz band processing).

Figure 4:
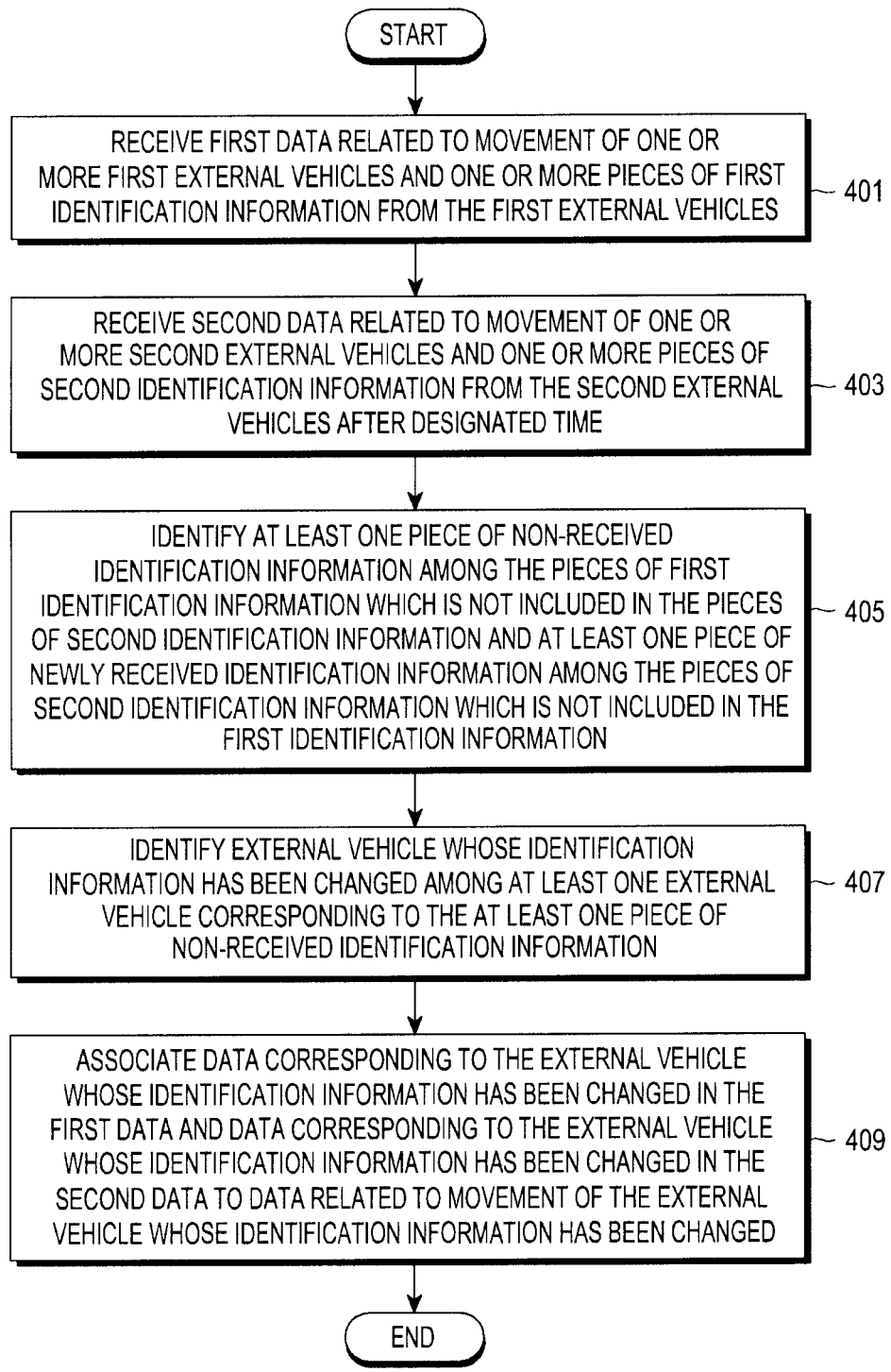
FIG. 4 is a flowchart illustrating a method for operating an electronic device according to an embodiment.

FIG. 4 is a flowchart illustrating a method for operating an electronic device according to an embodiment.

According to an embodiment, the electronic device 101 (e.g., the processor 120) may receive one or more pieces of first identification information and first data related to the movement of one or more first external vehicles (e.g., 220 or 240) from the one or more first external vehicles (e.g., 220 or 240) in operation 401. Where the electronic device 101 is included in or is, e.g., the mobile terminal device 290, the electronic device 101 may receive the first identification information and the first data from the vehicle 220 or the vehicle 240. Where the electronic device 101 is included in, e.g., the vehicle 220, the electronic device 101 may receive the first identification information and the first data from the vehicle 240 or another vehicle. As used herein, "electronic device 101 performs a particular operation" may mean, e.g., that the processor 120 of the electronic device 101 performs the particular operation or controls other hardware to perform the particular operation. "Electronic device 101 performs a particular operation" may mean, e.g., that, as instructions stored in the memory 130 of the electronic device 101 are executed, the processor 120 performs the particular operation or controls other hardware to perform the particular operation. In operation 403, after a designated time elapses, the electronic device 101 may receive, from one or more second external vehicles, one or more pieces of second identification information and second data related to the movement of the one or more second external vehicles. Here, the second identification information may not be identical to the first identification information. For example, the first identification information including two pieces of identification information (e.g., V1 and V2) may be received at a first time, and the second identification information including two pieces of identification information (e.g., V1 and V3) may be received at a second time. In this case, the identification information V3 about the vehicle 250 may be updated information of the identification information V2 about the vehicle 250. Thus, the second identification information may include at least one piece of newly received identification information (e.g., V3) which is not included in the first identification information. Thus, the identification information that is not received at the second time (e.g., V2) may be identified from the first identification information. For example, where the electronic device 101 transmits a BSM-containing communication signal, the electronic device 101 may vary the identification information contained in the BSM when a predetermined time elapses. In this case, the first identification information may differ from the second identification information. As set forth above, the first identification information may contain identification information which is not included in the second identification information, and the second identification information may include newly received identification information which is not included in the first identification information. In operation 405, the electronic device 101 may identify at least one piece of non-received identification information (i.e. identification information that is not received at the second time) among the one or more pieces of first identification information, which is not included in the one or more pieces of second identification information, and at least one piece of newly received identification information of the second identification information, which is not included in the first identification information. In operation 407, the electronic device 101 may identify the external vehicle of which identification information has been changed among at least one external vehicle corresponding to the at least one piece of non-received identification information. The electronic device 101 may identify the external vehicle of which identification information has been changed among the at least one external vehicle corresponding to the non-received identification information using at least part of data corresponding to the non-received identification information and at least part of data corresponding to the newly received identification information. For example, where a position determined based on the data corresponding to the at least one piece of newly received identification information falls within a position range determined based on the data corresponding to the at least one piece of non-received identification information, the electronic device 101 may determine the external vehicle as the external vehicle of which identification information is changed. In operation 409, the electronic device 101 may associate data corresponding to the external vehicle of which identification information is changed in the first data and data corresponding to the external vehicle of which identification information is changed in the second data as data related to the movement of the external vehicle of which identification information is changed. For example, as at least part of association of the data related to the movement of the external vehicle of which identification information is changed, the electronic device 101 may associate the data corresponding to the external vehicle of which identification information is changed in the first data to the identification information corresponding to the external vehicle of which identification information is changed in the at least one piece of newly received identification information. The electronic device 101 may provide driving information regarding the first external vehicles or the second external vehicles based on the first data or the second data. The electronic device 101 may control the driving of the vehicle where the electronic device 101 is placed based on the first data or the second data.

FIG. 5A is a view illustrating an electronic device and a vehicle according to an embodiment. The embodiment of FIG. 5A is described in greater detail with reference to FIG. 5B. FIG. 5B is a table illustrating data managed by an electronic device according to an embodiment.

According to an embodiment, the mobile terminal device 290 may transmit a communication signal 531 containing information associated with the pedestrian's safety (e.g., a PSM-containing communication signal) at a first time t1 and a communication signal 532 containing information associated with the pedestrian's safety (e.g., a PSM-containing communication signal) at a second time t2. The electronic device 101 (e.g., the communication module 190) included or placed in the vehicle 220 may transmit a communication signal 501 containing information associated with the driving of the vehicle 220 (e.g., a BSM-containing communication signal) at the first time t1 and a communication signal 502 containing information associated with the driving of the vehicle 220 (e.g., a BSM-containing communication signal) at the second time t2. The vehicle 240 may transmit a communication signal 511 containing information associated with the driving of the vehicle 240 (e.g., a BSM-containing communication signal) at the first time t1 and a communication signal 512 containing information associated with the driving of the vehicle 240 (e.g., a BSM-containing communication signal) at the second time t2. The vehicle 250 may transmit a communication signal 521 containing information associated with the driving of the vehicle 250 (e.g., a BSM-containing communication signal) at the first time t1 and a communication signal 522 containing information associated with the driving of the vehicle 250 (e.g., a BSM-containing communication signal) at the second time t2. Although FIG. 5A illustrates as if all the entities 101, 220, 240 and 250 transmit communication signals at the first time t1 and the second time t2, this is merely intended for ease of description. Communication signals may be transmitted only once, or more than two times. The time when the vehicle 240 transmits the communication signal 511 may differ from the time when the vehicle 250 transmits the communication signal 521. The electronic device 101 may be implemented in a similar form to the mobile terminal device 290, and the user may get in the vehicle 220 while carrying the mobile terminal device 290. In this case, the electronic device 101, although it is a mobile terminal device, may be operated as an electronic device (e.g., 221, 222, or 223) inside the vehicle. Thus, the electronic device 101 may receive BSM- or PSM-containing communication signals or transmit BSM-containing communication signals.

The electronic device 101 (e.g., the processor 120) included in the vehicle 220 may manage, information (e.g., driving log) such as those shown in FIG. 5B. For example, the information 550 may be categorized into identification information 551, position 552, speed 553, heading 554, or peculiarity 555 and may include data types for at least part of BSMs or PSMs. The electronic device 101 may manage various message set types. As described above, the vehicle 220 may receive a communication signal 511, a communication signal 521, or a communication signal 531 at the first time t1. The communication signal 511 may include identification information V1 about the vehicle 240, the communication signal 521 may include identification information V2 about the vehicle 250, and the communication signal 531 may include identification information P1 about the electronic device 101. The electronic device 101 may manage the information 550 at the first time t1 560 and the second time t2 570. The electronic device 101 may manage the time when the communication signal is received or the time stamp contained in the communication signal without classifying the communication signals into the first time t1 560 and the second time t2 570. The electronic device 101 may manage information 561 corresponding to the communication signal 511. For example, the electronic device 101 may manage information related to the movement of the vehicle 240, such as position information (a1,b1,c1) about the vehicle 240, speed information S1 about the vehicle 240, heading information θ1 about the vehicle 240, and peculiarity information about the vehicle 240, e.g., whether the vehicle 240 exhibits reckless driving. The information related to the movement of the vehicle 240 may correspond to the identification information V1 about the vehicle 240. The electronic device 101 may identify the peculiarity, such as reckless driving, based on the information contained in the communication signal 511 or determine the peculiarity using prior history of the vehicle 240. For example, the electronic device 101 may receive and manage, before the first time t1, an information history for the position of the vehicle 240 corresponding to the identification information V1 and may determine the peculiarity of reckless driving by determining that the number of times in which the vehicle 240 changes lanes exceeds a designated number within a designated time or the heading of the vehicle 240 departs from a designated range. Accordingly, the electronic device 101 may determine the peculiarity of reckless driving based on prior information. The electronic device 101 may manage information 562 included in the communication signal 521. For example, the electronic device 101 may manage information related to the movement of the vehicle 250, such as position information (a2,b2,c2) about the vehicle 250, speed information S2 about the vehicle 250, heading information θ2 about the vehicle 250, and peculiarity information about the vehicle 250, e.g., hard braking. The information related to the movement of the vehicle 250 may correspond to the identification information V2 about the vehicle 250. The electronic device 101 may manage information 563 included in the communication signal 531. For example, the electronic device 101 may manage information related to the movement of the mobile terminal device 290, such as position information (a3,b3,c3) about the mobile terminal device 290, speed information S3 about the mobile terminal device 290, and heading information θ3 about the mobile terminal device 290. The information related to the movement of the mobile terminal device 290 may correspond to the identification information P1 about the mobile terminal device 290. Meanwhile, the vehicle 250 may change its identification information V2 to the identification information V3. The vehicle 250 may transmit a communication signal 522 including the identification information V3. The electronic device 101 included in the vehicle 220 may receive the communication signal 512, the communication signal 522, or the communication signal 532 at the second time t2. The communication signal 512 may include the identification information V1 about the vehicle 240, the communication signal 522 may include the identification information V3 about the vehicle 250, and the communication signal 532 may include the identification information P1 about the electronic device 101. The electronic device 101 may manage information 571 corresponding to the communication signal 512. For example, the electronic device 101 may manage information related to the movement of the vehicle 240, such as position information (a4,b4,c4) about the vehicle 240, speed information S4 about the vehicle 240, heading information θ1 about the vehicle 240, and peculiarity information about the vehicle 240, e.g., reckless driving. The information related to the movement of the vehicle 240 may correspond to the identification information V1 about the vehicle 240. The electronic device 101 may associate the peculiarity of reckless driving for the identification information V1 about the vehicle 240 at the second time t2, corresponding to the peculiarity of reckless driving for the identification information V1 about the vehicle 240 at the first time t1. The electronic device 101 may manage information 572 included in the communication signal 522. For example, the electronic device 101 may manage information related to the movement of the vehicle 250, such as position information (a5,b5,c5) about the vehicle 250, speed information S2 about the vehicle 250, and heading information θ2 about the vehicle 250. The information related to the movement of the vehicle 250 may correspond to the identification information V3 about the vehicle 250. The electronic device 101 may determine that the identification information V3 corresponds to the identification information V2. For example, the electronic device 101 may determine the non-received identification information V2 from the prior received identification information (e.g., V1 and V2). The electronic device 101 may determine the newly received identification information V3 from the received identification information (e.g., V1 and V3). The electronic device 101 may determine the correspondence between the non-received identification information V2 and the newly received identification information V3. For example, the electronic device 101 may compare other pieces of information (e.g., pieces of information contained in the BSM or PSM, such as position, speed, and heading) received along with the identification information and may determine the correspondence between the non-received identification information V2 and the newly received identification information V3 based on a result of the comparison. The electronic device 101 may predict the position of the vehicle 250 at the second time t2 by applying the speed information S2 and the heading information θ2 to the position information (a2,b2,c2) at the first time t1. The electronic device 101 may compare the predicted position at the second time t2 with the position (a5,b5,c5) corresponding to the identification information V3 about the vehicle 250 at the second time t2, and when the different in position is less than a designated value, the electronic device 101 may determine that the identification information V3 corresponds to the identification information V2. Thus, the electronic device 101 may determine whether the identification information V2 about the vehicle 250 corresponds to the identification information V3 about the vehicle 250 by determining whether a position range determined by at least part of the information contained in the communication signal 512 falls within a position range determined by at least part of the information contained in the communication signal 511. The electronic device 101 may determine a moving trend of the vehicle 250 corresponding to the identification information V2. The electronic device 101 may determine the correspondence between the identification information V2 and the identification information V3 based on whether the position corresponding to the identification information V3 corresponds to the moving trend. For example, the electronic device 101 may determine the correspondence between the identification information V2 and the identification information V3 by determining whether an element (position, speed, or acceleration) corresponding to the identification information V3 that matches linearly with an element (e.g., displacement, speed, or acceleration) representing the moving trend. The electronic device 101 may determine whether the identification information V2 corresponds to the identification information V3 by making a comparison in similarity between at least part of the information received along with the identification information V2 and at least part of the information received along with the identification information V3. Upon determining that the similarity exceeds a designated value, the electronic device 101 may determine that the identification information V3 corresponds to the identification information V2. For example, the electronic device 101 may also determine that the identification information V2 corresponds to the identification information V3 based on the fact that the speed S2 and heading θ2 corresponding to the identification information V2 are the same as the speed S2 and heading θ2, respectively, corresponding to the identification information V3. In other words, the electronic device 101 may determine the correspondence between the pieces of identification information by using other information than the position of the vehicle. Upon identifying the non-received information from the identification information that the electronic device 101 previously received and newly received identification information, the electronic device 101 may allow the newly received identification information to correspond to the non-received identification information. In another example, upon determining that the vehicle 250 is currently positioned not at an entrance or exit of a roadway, e.g., an interchange, the electronic device 101 may allow the newly received identification information of the vehicle 250 to correspond to the non-received identification information.

According to an embodiment, upon determining that the identification information V2 about the vehicle 250 corresponds to the identification information V3 about the vehicle 250, the electronic device 101 (e.g., the processor 120) may associate the information (e.g., peculiarity) corresponding to the identification information V2 to the identification information V3 about the vehicle 250 so that the information (e.g., peculiarity) corresponds to the identification information V3. Accordingly, the electronic device 101 may store the peculiarity of hard braking as the information 572 corresponding to the identification information V3. The electronic device 101 may associate the information 562 and the information 572 as the information about the vehicle 250 of which identification information is determined to have been changed. The electronic device 101 may calculate the speed or acceleration corresponding to the distance between the position (a2,b2,c2) at the first time t1 and the position (a5,b5,c5) at the second time t2. By identifying that the calculated acceleration (e.g. deceleration) exceeds a threshold, the electronic device 101 may determine the peculiarity of hard braking on the vehicle 250. In other words, the electronic device 101 may inherit the prior stored peculiarity as it is or determine the peculiarity using the current parameter (e.g., the position, speed, or heading at the second time) in connection with the prior stored parameter (e.g., the position, speed, or heading at the first time). The electronic device 101 may manage information 573 included in the communication signal 532. The electronic device 101 may manage information related to the movement of the mobile terminal device 290, such as position information (a6,b6,c6) about the mobile terminal device 290, speed information S5 about the mobile terminal device 290, and heading information θ3 about the mobile terminal device 290. The information related to the movement of the mobile terminal device 290 may corresponding to the identification information P1 about the mobile terminal device 290. Even when the identification information V1 about the vehicle 240 or the identification information P1 about the mobile terminal device 290 is changed later, the electronic device 101 may determine that the changed identification information corresponds to the non-received identification information and may associate the information about the vehicle 240 or mobile terminal device 290 to the prior information and manage the information. Where the electronic device 101 determines the particularity of the vehicle 250 corresponding to the identification information V3 about the vehicle 250, the electronic device 101 may use both the data corresponding to the identification information V3 and the data corresponding to the prior identification information V2.

According to an embodiment, the electronic device 101 may determine the correspondence between the pieces of identification information of a vehicle based on the similarity of characteristics (e.g., quick accelerating/quick decelerating/dangerous driving, etc.) determined from information received from the vehicle. For example, the electronic device 101 may store processed information (e.g., the peculiarity of hard braking) corresponding to the processed identification information V2 and identify processed information (e.g., the peculiarity of hard braking) corresponding to the identification information V3. The electronic device 101 may determine that the identification information V2 corresponds to the identification information V3 based on the similarity between the processed pieces of information.

Figure 6:
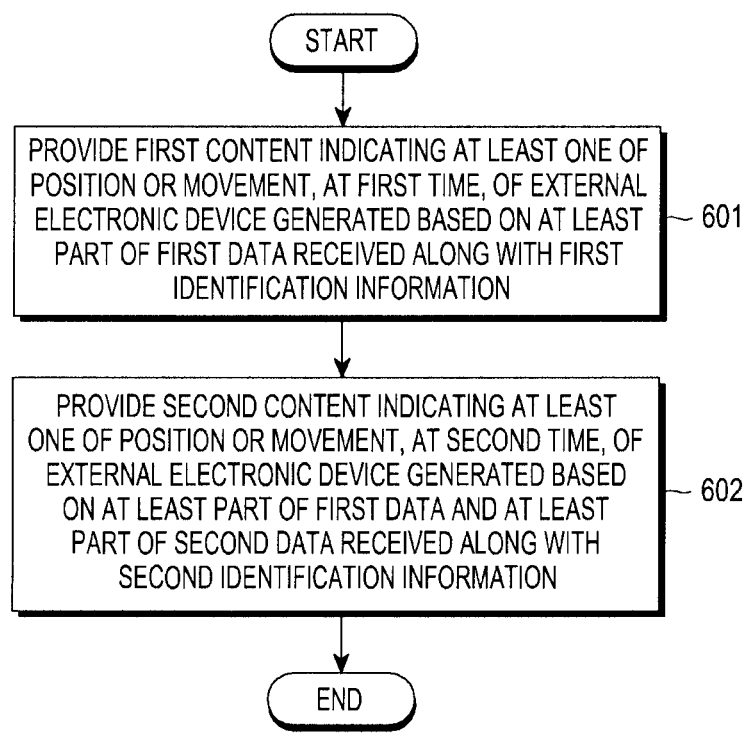
FIG. 6 is a flowchart illustrating a method for operating an electronic device according to an embodiment.
Figure 7A:
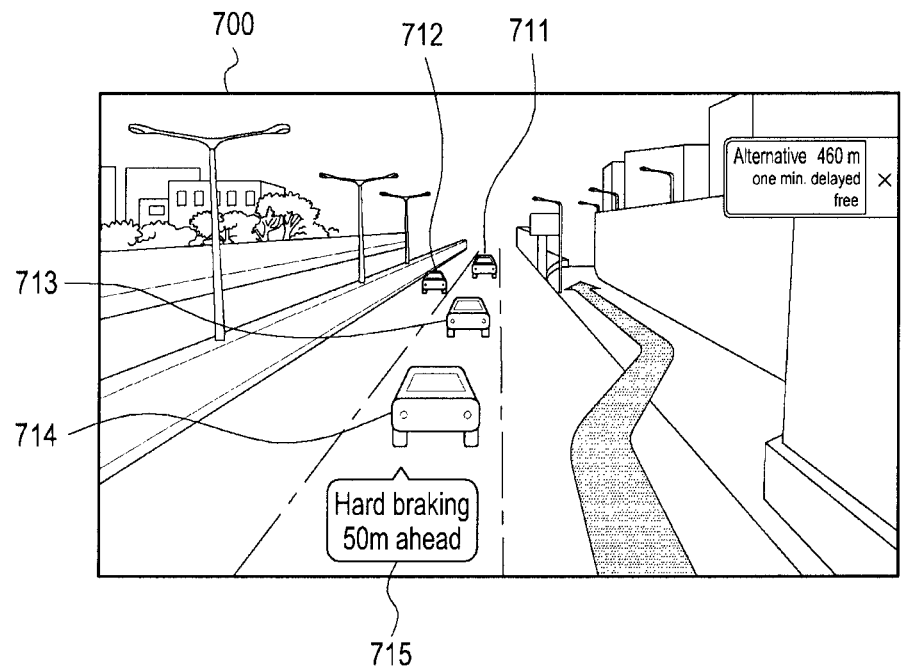
FIGS. 7A and 7B are views illustrating graphic objects according to an embodiment.
Figure 7B:
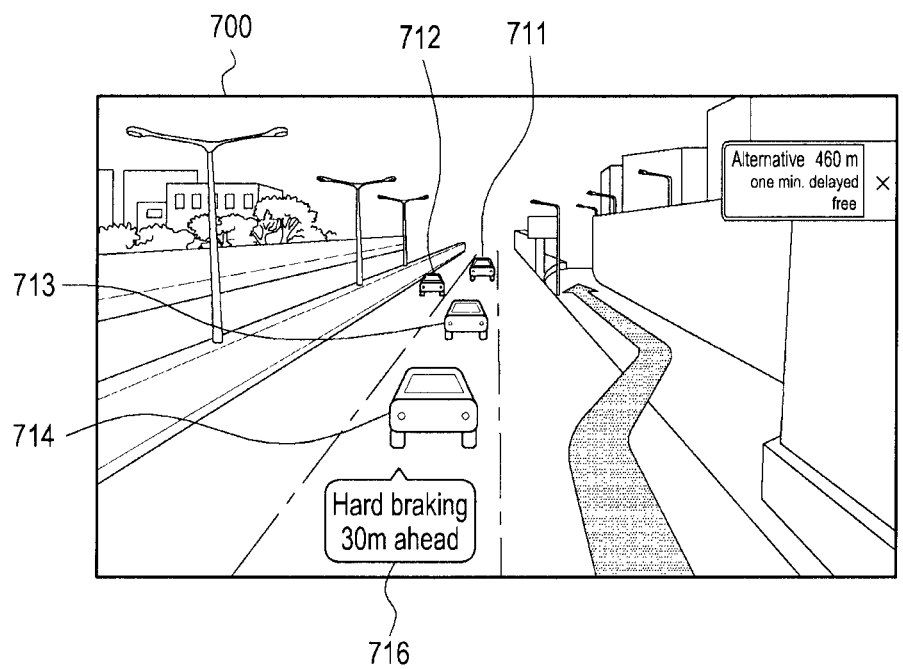

FIG. 6 is a flowchart illustrating a method for operating an electronic device according to an embodiment. The embodiment related to FIG. 6 is described in greater detail with reference to FIGS. 7A and 7B. FIGS. 7A and 7B are views illustrating graphic objects according to an embodiment.

According to an embodiment, in operation 601, the electronic device 101 (e.g., the processor 120) may provide a first content indicating at least one of the position and movement, at a first time, of an external electronic device, generated based on at least part of first data received along with first identification information from the external electronic device. For example, the electronic device 101 may display a navigation screen 700 including at least one content as shown in FIG. 7A. The navigation screen 700 may include graphic objects for surrounding terrain features or graphic objects included in a general navigation screen such as guidance information about a route to the destination. The electronic device 101 may reflect information received from the WAVE communication module to the navigation screen 700. The electronic device 101 may determine at least one of the position and movement of nearby vehicles based on communication signals (e.g., BSM-containing communication signals) received from the nearby vehicles. It is assumed in the embodiment of FIG. 7A that the electronic device 101 receives communication signals from four nearby vehicles. The electronic device 101 may identify the position of other vehicles based on the information contained in the received communication signals. The electronic device 101 may reflect graphic objects 711, 712, 713, and 714 representing the vehicles onto the navigation screen 700, corresponding to the position of the other vehicles. The electronic device 101 may provide the graphic objects 711, 712, 713, and 714 indicating at least one of the position and movement of the vehicles. For example, the electronic device 101 may show the respective positions of the vehicles as corresponding points on the navigation screen 700. For example, the electronic device 101 may show a graphic object (e.g., 711) in a relatively small size when the corresponding vehicle is relative far away from the electronic device. Conversely, the electronic device 101 may show a graphic object (e.g., 714) in a relatively larger size when the corresponding vehicle is relatively close to the electronic device 101. However, the sizes of the graphic objects are merely an example. The attribute, e.g., size, of the graphic object may be determined based on data received from the vehicle. The electronic device 101 may display the graphic object 715 representing information about the peculiarity of the vehicle. For example, the electronic device 101 may manage the peculiarity information indicating that the fourth vehicle is braking hard. The electronic device 101 may determine the "hard braking" information using both the prior information about the fourth vehicle and the currently-received information contained in the BSM or based on the brake state information contained in the BSM. The electronic device 101 may display the graphic object 715 including the peculiarity of the fourth vehicle. In other words, the electronic device 101 may provide content associated with the fourth vehicle (e.g., at least one of the graphic object 714 and the graphic object 715) corresponding to at least part of the data received along with the identification information about the fourth vehicle. Here, "electronic device 101 provides content associated with a vehicle" may mean that the electronic device 101 may render the graphic object (e.g., the graphic object 714) corresponding to the vehicle based on at least part of the data and provide the rendered graphic object. "Electronic device 101 provides content associated with a vehicle" may mean that the electronic device 101 displays an additional object (e.g., the graphic object 715) together with the graphic object (e.g., the graphic object 714) corresponding to the vehicle. Although FIG. 7A illustrates a configuration in which the electronic device 101 displays the graphic object 715 including text for the peculiarity and the distance to the fourth vehicle, the additional information about the fourth vehicle is not so limited and may include any additional information contained in the BSM or generated from the information contained in the BSM. Although FIG. 7A illustrates that the navigation screen 700 includes the surrounding topography, this is merely an example. The electronic device 101 may reflect the position of the vehicles onto such navigation screens as a two-dimensional (2D) map or three-dimensional (3D) map.

According to an embodiment, in operation 602, the electronic device 101 (e.g., the processor 120) may provide a second content indicating at least one of the position and movement, at the second time, of the external electronic device, generated based on at least part of first data and at least part of second data received along with second identification information different from the first identification information. For example, after the fourth vehicle updates the identification information, the fourth vehicle may transmit a BSM-containing communication signal. By the above-described method, the electronic device 101 may determine that the newly received identification information corresponds to the prior identification information about the fourth vehicle. The electronic device 101 may associate data contained in the communication signal of the newly received identification information to the prior data managed corresponding to the fourth vehicle. The electronic device 101 may provide content corresponding to at least part of data corresponding to the prior identification information and at least part of data corresponding to the new identification information. For example, the electronic device 101 may provide a graphic object 716 indicating the information about the peculiarity of the vehicle as shown in FIG. 7B, in association with the graphic object 714 corresponding to the fourth vehicle. The graphic object 716 may include the peculiarity of hard braking that was previously associated in relation to the fourth vehicle and a distance which is information determined based on the position information contained in the newly received communication signal. As shown in FIG. 7B, the content corresponding to the prior data and the newly received data may include text (e.g., information indicating the peculiarity "hard braking") partially identical to the content corresponding to the prior data. Or, the content may be determined based on the prior data and the newly received data, and may differ from the prior content provided. Also in this case, the content may be provided in association with the prior vehicle. As set forth above, the content at the second time may be generated based on at least part of the data corresponding to the second time and at least part of the data corresponding to the first time.

Figure 8A:
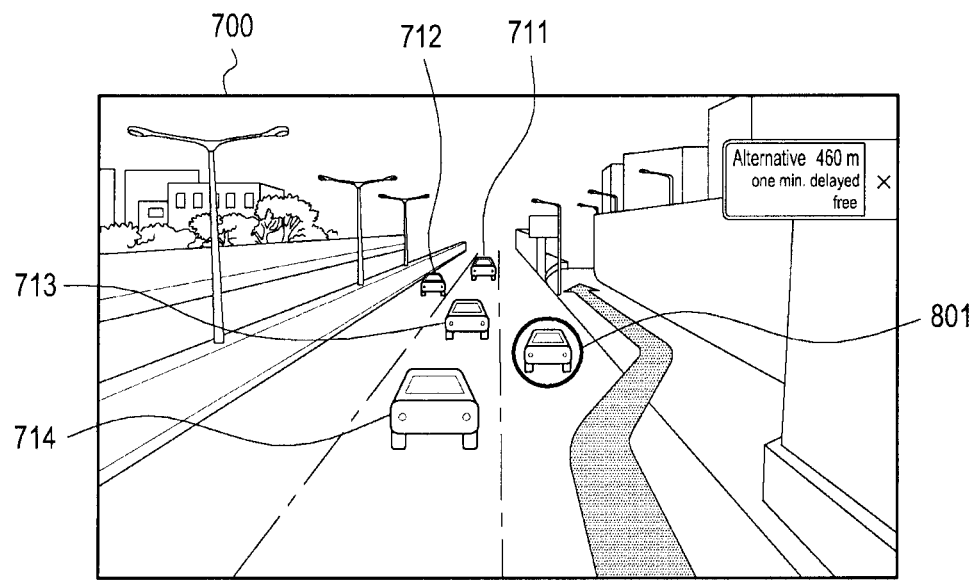
FIGS. 8A and 8B are views illustrating graphic objects according to another embodiment.

According to an embodiment, the electronic device 101 (e.g., the processor 120) may display content other than text. For example, as shown in FIG. 8A, the electronic device 101 may provide a graphic object 801 corresponding to the vehicle of which peculiarity is identified as hard braking or reckless driving. The electronic device 101 may generate this graphic object, which may alert the user to the peculiarity, based on at least the received data. For example, the electronic device 101 may provide the graphic object 801 in which a circular object surrounds the vehicle. The shape of the circular object is merely an example. In another example, the electronic device 101 may display the vehicle with the peculiarity in another color. The electronic device 101 may display the graphic object 801 in a way to differentiate the vehicle with the peculiarity from other vehicles driving normally. The electronic device 101 may show the graphic object 801 on the navigation screen 700 using the position information received along with the identification information. For example, the electronic device 101 may determine the distance between the electronic device 101 and the vehicle with the peculiarity based on the position of the electronic device 101 and the position of the vehicle with the peculiarity and may show the graphic object 801 on the position on the navigation screen corresponding to the determined distance.

Figure 8B:
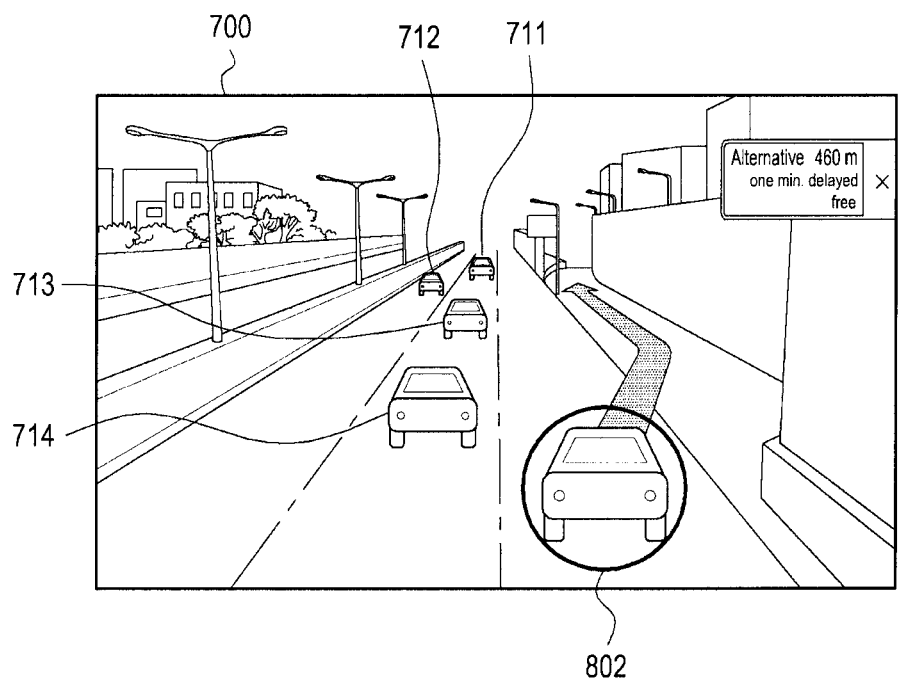

According to an embodiment, the electronic device 101 (e.g., the processor 120) may receive the identification information-changed communication signal and allow the newly received identification information to correspond to the prior identification information. The electronic device 101 may provide a graphic object 802 (as shown in FIG. 8B), which is content corresponding to at least part of the prior data and at least part of the data received along with the newly received identification information, in association with the vehicle having peculiarity. The electronic device 101 may determine to generate an object for alerting based on the prior information. The electronic device 101 may use prior information, "hard braking," about the vehicle having peculiarity to generate an object for alerting. The electronic device 101 may calculate the acceleration of the fifth vehicle based on at least the received speed or position of the vehicle having peculiarity and the prior position or speed of the vehicle having peculiarity and may determine the information "hard braking" using the calculated acceleration. The electronic device 101 may identify the position of the vehicle having peculiarity contained in the newly received information and determine the distance between the electronic device 101 and the vehicle having peculiarity. The electronic device 101 may show the graphic object 802 along with the determined distance. The graphic object 802 may include the vehicle and a circular graphic object surrounding the vehicle. The attribute (e.g., shape or color) of at least part of the graphic object 802 may be the same as the attribute (e.g., shape or color) of at least part of the graphic object 801.

According to an embodiment, the electronic device 101 (e.g., the processor 120) may output content through the audio module 170. For example, as shown in FIGS. 8A and 8B, upon determining that the vehicle having peculiarity is hard braking, the electronic device 101 may output an alert voice through the audio module 170. But the content generated by the electronic device 101 is not so limited and other content to alert the user are possible.

Figure 9:
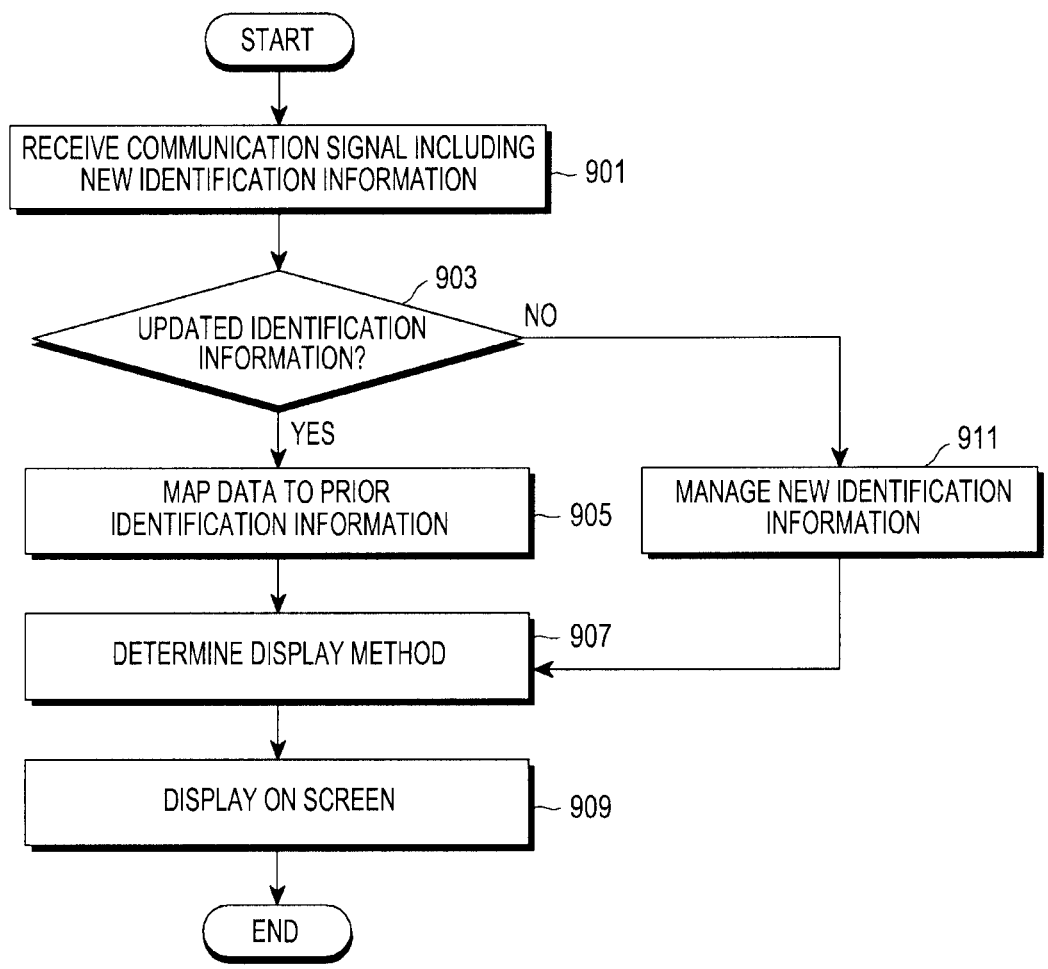
FIG. 9 is a flowchart illustrating a method for operating an electronic device according to an embodiment.

FIG. 9 is a flowchart illustrating a method for operating an electronic device according to an embodiment.

According to an embodiment, the electronic device 101 (e.g., the processor 120) may receive a communication signal containing new identification information in operation 901. The electronic device 101 may manage information contained in the prior received communication signal and may identify that the identification information contained in the newly received communication signal is not included in the prior identification information managed. In operation 903, the electronic device 101 may determine whether the newly identification information is updated identification information. The electronic device 101 may determine whether the new identification information is updated identification information based on at least data corresponding to the new identification information and data corresponding to the prior identification information. Upon determining that the new identification information is updated identification information, the electronic device 101 may map data of the new identification information to data of the prior identification information in operation 905. In operation 907, the electronic device 101 may determine a display method. In operation 909, the electronic device 101 may display a screen on the display device 160. Upon determining that the new identification information is not updated identification information, the electronic device 101 may manage the information as new identification information in operation 911.

Figure 10:
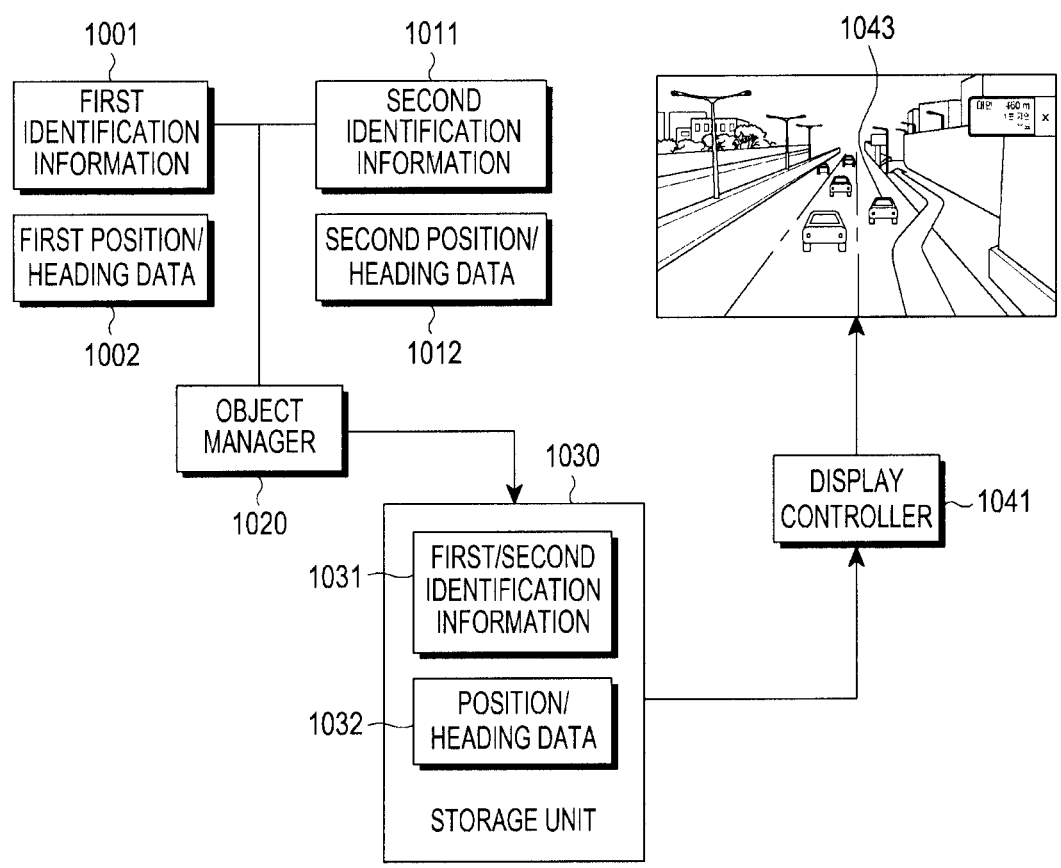
FIG. 10 is a block diagram illustrating an electronic device according to an embodiment.

FIG. 10 is a block diagram illustrating an electronic device according to an embodiment.

According to an embodiment, the electronic device 101 (e.g., the processor 120) may receive a communication signal containing first identification information 1001 and first position/heading data 1002 at a first time. The electronic device 101 may receive a communication signal containing second identification information 1011 and second position/heading data 1012 at a second time. Thus, at the second time, the electronic device 101 does not receive the first identification information 1001 and may newly receive the second identification information 1011. An object manager 1020 may store the position/heading data in a storage unit 1030 (e.g., the memory 130) and may manage the data. Upon receiving new identification information, the object manager 1020 may determine whether the new identification information is updated identification information of the prior identification information, and if so, may map the identification information. The object manager 1020 may determine whether the second identification information 1011 is updated identification information of the first identification information 1001. The object manager 1020 may determine whether the pieces of information 1002 and 1012 correspond to each other in various ways described above. For example, the object manager 1020 may determine a predicted position radius at the second time based on the first position/heading data 1002, and upon determining that the position of the second position/heading data 1012 falls within the predicted position radius, the object manager 1020 may determine that the first identification information 1001 corresponds to the second identification information 1011. The object manager 1020 may store the position/heading data 1032 in association with the first/second identification information 1031. The object manager 1020 may be a software module executed by the processor 120 or a core-type hardware module included in the processor 120. Alternatively, the object manager 1020 may be a hardware module independent from the processor 120. A display controller 1041 may receive rendering data generated based on at least the position/heading data 1032 and control the display device 160 to display a screen 1043 based on the rendering data.

Figure 11:
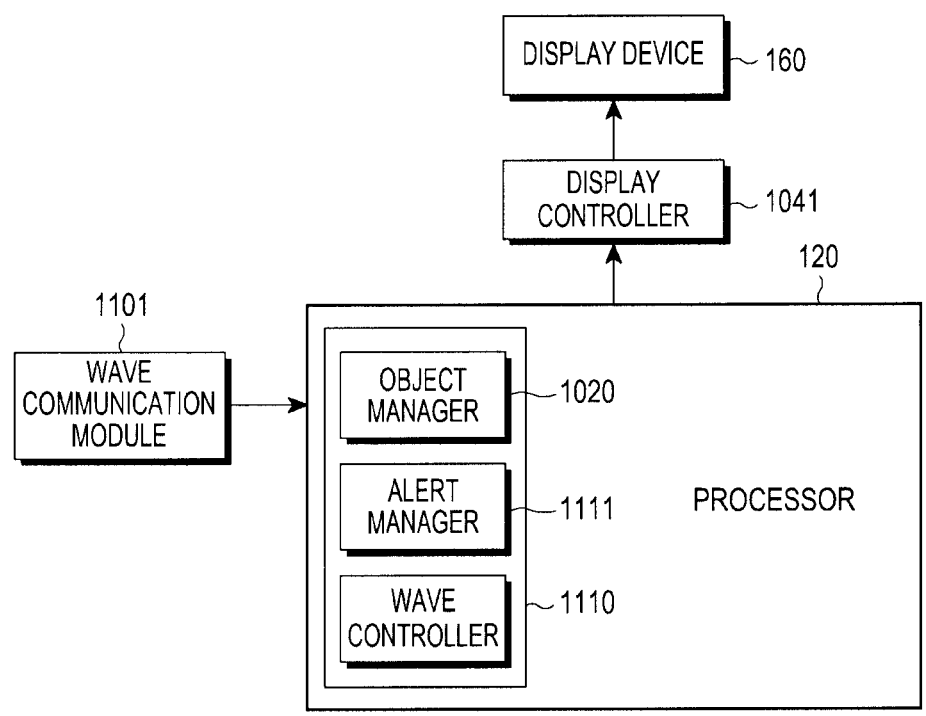
FIG. 11 is a block diagram illustrating an electronic device according to an embodiment of the present disclosure.

FIG. 11 is a block diagram illustrating an electronic device according to an embodiment of the present disclosure.

According to an embodiment, the processor 120 (e.g., an application processor (AP) or sensor hub processor) may receive a communication signal as defined in the WAVE communication standards through a WAVE communication module 1101 (e.g., the vehicle communication module 341). According to an embodiment, the WAVE communication module 1101 may decode the communication signal and provide identification information and information corresponding to the identification information to the processor 120. Or, the processor 120 may receive information from the WAVE communication module 1101 and decode the received information to obtain the identification information and the information corresponding to the identification information. Where the processor 120 includes the main processor 121 and the auxiliary processor 123, and the main processor 121 is in the sleep mode, the auxiliary processor 123 may receive information from the WAVE communication module 1101. A WAVE controller 1110 may manage the information obtained through the WAVE communication module 1101. The WAVE controller 1110 may be a software module executed by the processor 120 or a core-type hardware module included in the processor 120. Alternatively, the WAVE controller 1110 may be a hardware module independent from the processor 120. The object manager 1020 may manage the information received through the WAVE communication module 1101. Where the identification information is updated, the object manager 1020 may allow the updated identification information to correspond to the prior identification information and associate the remaining data with each other. The object manager 1020 may manage the information received through the WAVE communication module 1101 per object (e.g., vehicle or pedestrian). Where the identification information is updated, the object manager 1020 may allow the updated identification information to correspond to the prior identification information and associate the remaining data to the object corresponding to the prior identification information. Where the identification information is updated, the object manager 1020 may allow the updated identification information to correspond to the prior identification information and associate the data corresponding to the prior identification information to the updated identification information. An alert manager 1111 may determine whether to alert the user based on at least managed information. Upon determining that alerting is needed, the alert manager 1111 may provide an alert content through, e.g., the display device 160. A display controller 1041 may receive data for rendering content and control the display device 160 to display the data.

Figure 12:
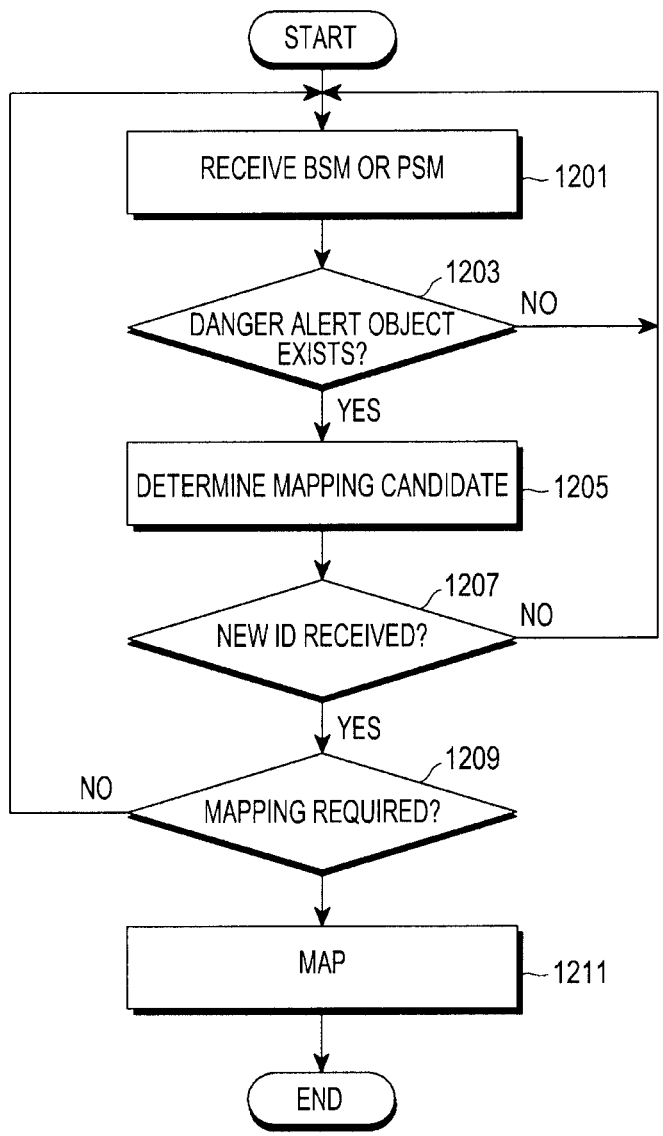
FIG. 12 is a flowchart illustrating a method for operating an electronic device according to an embodiment.

FIG. 12 is a flowchart illustrating a method for operating an electronic device according to an embodiment.

According to an embodiment, the electronic device 101 (e.g., the processor 120) may receive a BSM- or PSM-containing communication signal in operation 1201. In operation 1203, the electronic device 101 may determine whether the received BSM or PSM includes a danger alert object. For example, in operation 1205, the electronic device 101 may determine that the vehicle is hard braking or recklessly driving based on at least the received BSM and may determine the corresponding identification information or corresponding object as a mapping candidate. The electronic device 101 may determine the identification information or vehicle for which hard braking or reckless driving is predicted as a mapping candidate. The electronic device 101 may identify a pedestrian who stays on the side of the road over a designated time, and the electronic device 101 may determine the pedestrian as a target for mapping. In operation 1207, the electronic device 101 may determine whether new identification information is received. Upon determining that new identification information is received, the electronic device 101 may determine whether identification information mapping is required in operation 1209. Upon determining that mapping is required, the electronic device 101 may determine the mapping candidate as a target for mapping and map the new identification information to the mapping candidate in operation 1211.

Figure 13:
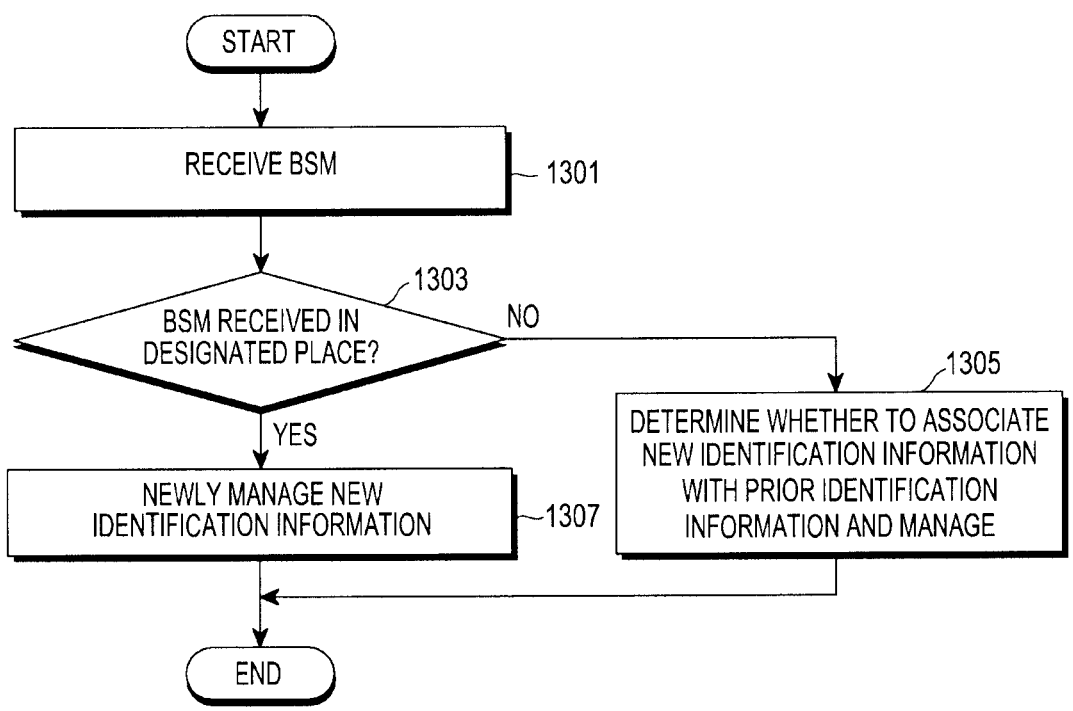
FIG. 13 is a flowchart illustrating a method for operating an electronic device according to an embodiment.

FIG. 13 is a flowchart illustrating a method for operating an electronic device according to an embodiment.

According to an embodiment, the electronic device 101 (e.g., the processor 120) may receive a BSM-containing communication signal in operation 1301. In operation 1303, the electronic device 101 may determine whether where a BSM-containing communication signal is received corresponds to a pre-designated place (e.g., an interchange, near the entrance/exit of a parking lot, or a junction). For example, where the electronic device 101 is positioned in an interchange, the electronic device 101 may receive communication signals containing information indicating the interchange from RSUs in the interchange and determine whether the electronic device 101 is positioned in the interchange based on the communication signals. The electronic device 101 may previously receive and store information about the position of the interchange, compare the pre-received information with the current position of the electronic device 101, and determine whether the electronic device 101 is positioned in the interchange based on the result of the comparison. Where the communication signal is received in a place other than the interchange, the electronic device 101 may determine whether to associate new identification information with the prior identification information and manage the identification information in operation 1305. Where the communication signal is received in the interchange, the electronic device 101 may newly manage the new identification information in operation 1307, i.e. the electronic device 101 may reset the identification information. Since a number of vehicles enter or exit in the interchange, the electronic device 101 may temporarily stop updating the identification information and newly manage identification information contained in received communication signals.

Figure 14:
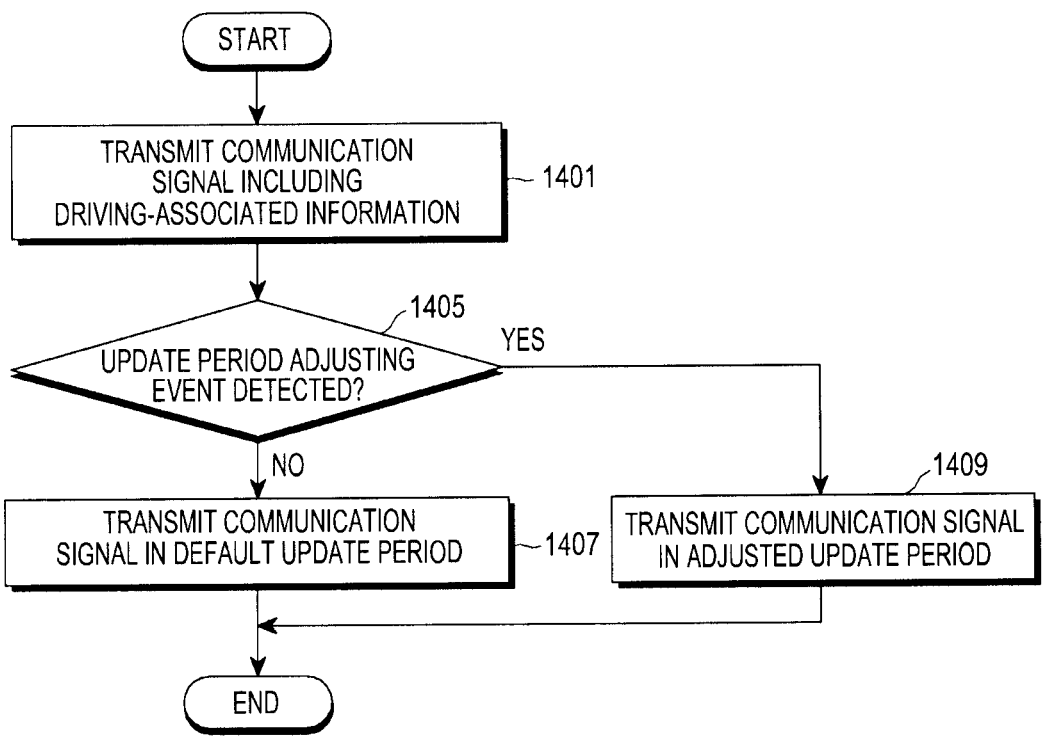
FIG. 14 is a flowchart illustrating a method for operating an electronic device according to an embodiment.

FIG. 14 is a flowchart illustrating a method for operating an electronic device according to an embodiment.

According to an embodiment, the electronic device 101 (e.g., the processor 120) may transmit a communication signal (e.g., a BSM-containing communication signal) including driving-associated information in operation 1401. In operation 1403, the electronic device 101 may determine whether an update period adjusting event is detected. Here, the update period adjusting event may be an event set to adjust the period of updating identification information. For example, upon determining that the vehicle having the electronic device 101 installed in is recklessly driving or hard braking, the electronic device 101 may set the update period to be longer than a default period. For example, upon receiving a communication signal instructing to change the update period from an external electronic device, e.g., an RSU, the electronic device 101 may be configured to update the identification information in a period different from the default period. Upon determining that the vehicle having the electronic device 101 placed in or the pedestrian carrying the electronic device 101 is in danger of an accident, the RSU may transmit a communication signal instructing to fix the identification information to the electronic device 101. In this case, the electronic device 101 may abstain from updating the identification information based on the received communication signal. The RSU may later determine that the electronic device 101 is out of danger of an accident and may transmit a communication signal instructing to unfix the identification information to the electronic device 101. The electronic device 101 may update the identification information according to the default period based on the received communication signal instructing to unfix the identification information. For example, following the WAVE standards, the electronic device 101 may change the signed security certificate after a predetermined time (e.g., 5 minutes) for privacy protection. The electronic device 101 may randomly determine messages to be broadcast whenever changing the signed security certificate. The electronic device 101 may adjust the use time of the signed security certificate to correspond to the adjusted update period for the identification information. Alternatively, the electronic device 101 may set the use time of the signed security certificate as previously designated while abstaining from updating the identification information corresponding to the update period adjusting event even though the signed security certificate is changed. Alternatively, the electronic device 101 may update the identification information corresponding to the update period adjusting event even before the signed security certificate is changed. Upon detecting no update period adjusting event, the electronic device 101 may update the identification information in the default update period in operation 1405. Upon detecting an update period adjusting event, the electronic device 101 may update the identification information in the adjusted update period.

Figure 15:
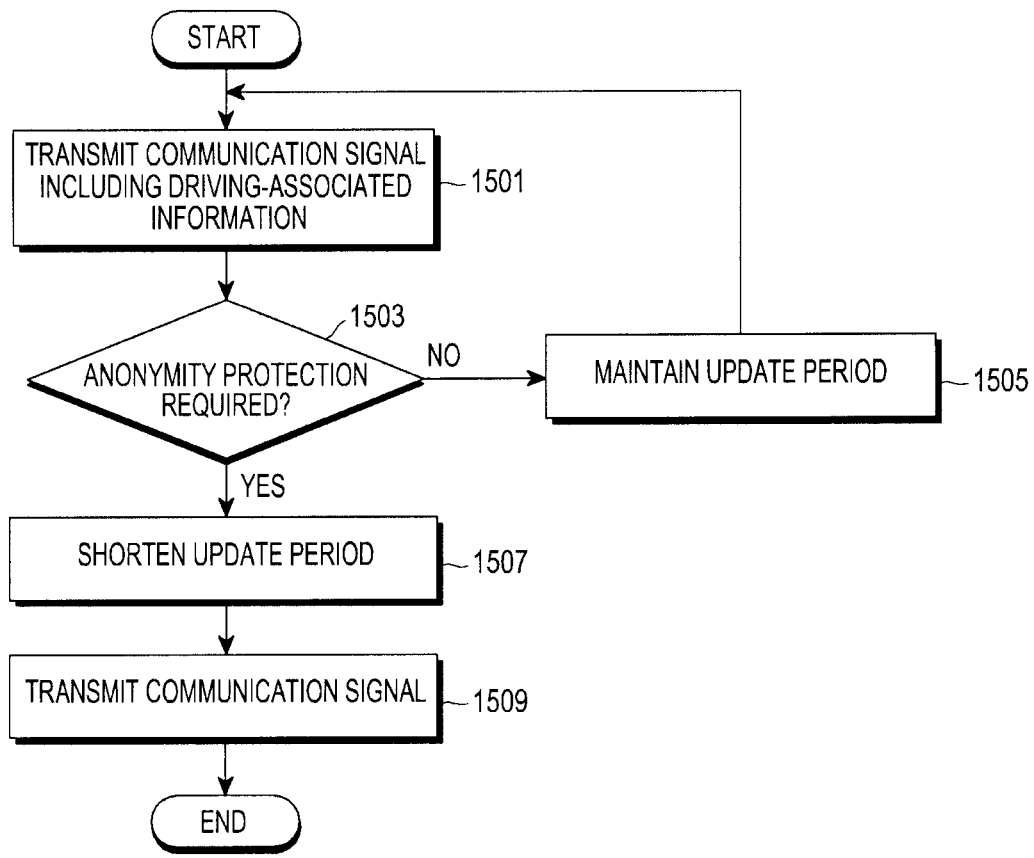
FIG. 15 is a flowchart illustrating a method for operating an electronic device according to an embodiment.

FIG. 15 is a flowchart illustrating a method for operating an electronic device according to an embodiment.

According to an embodiment, the electronic device 101 (e.g., the processor 120) may transmit a communication signal (e.g., a BSM-containing communication signal) including driving-associated information in operation 1501. In operation 1503, the electronic device 101 may determine, depending on the context, whether anonymity protection is required. For example, where the vehicle is driving in downtown or there are identified multiple WAVE electronic devices around, the electronic device 101 may determine that anonymity protection is needed. Upon determining that anonymity protection is required, the electronic device 101 may shorten the update period in operation 1507. Upon determining that anonymity protection is not required, the electronic device 101 may maintain the update period as the default period. In operation 1509, an electronic device 101 may send out a communication signal. Where the driving speed for the electronic device 101 is a particular value or less, the electronic device 101 may vary the update period, and where the driving speed exceeds the particular value, the electronic device 101 may prolong the update period.

Figure 16:
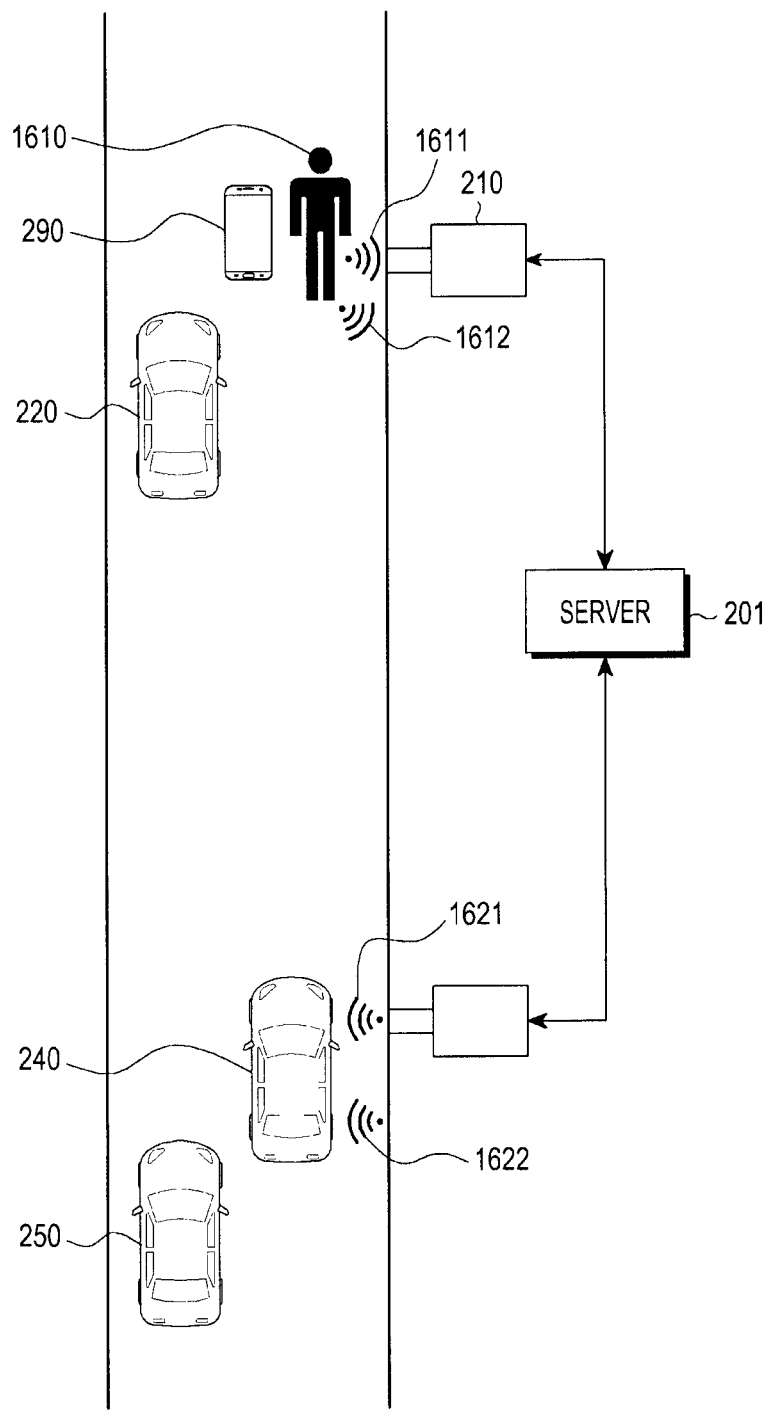
FIG. 16 is a view illustrating an electronic device, an RSU, and a vehicle according to an embodiment.

FIG. 16 is a view illustrating an electronic device, an RSU, and a vehicle according to an embodiment.

An RSU 210 and an RSU 211 may be positioned along a side of the road. The RSU 210 and the RSU 211 may communicate with each other via a server 201. Alternatively, the RSU 210 and the RSU 211 may communicate with each other directly without involvement of the server 201 or via another relay device. The pedestrian 1610 may stay on the road for a relatively long time while holding the electronic device 101. The electronic device 101 may transmit a communication signal 1611 (e.g., a PSM-containing communication signal) associated with the safety of the pedestrian 1610 at a first time. The vehicle 220 may receive the first communication signal 1611, determine the position of the pedestrian 1610, and adjust the driving corresponding to the position of the pedestrian 1610. The RSU 210 may store the time period at which the pedestrian 1610 is staying on the side of the road as a peculiarity for the corresponding position and update the server 201 with the peculiarity. The server 201 may transmit the peculiarity to the RSU 211. The RSU 211 may send out communication signals 1621 containing the information to other vehicles 240 or 250 near the RSU 211. The electronic device 101 may transmit a communication signal 1612 associated with the safety of the pedestrian 1610 at a second time. The electronic device 101 may include an identifier different from the identifier included in the communication signal 1611 in the communication signal 1612 for protecting the privacy of the pedestrian 1610. The RSU 210 (or the server 201) may compare the position information contained in the communication signal 1612 with the position information contained in the prior communication signal 1611, identifying that the identification information contained in the communication signal 1612 corresponds to the identification information contained in the communication signal 1611. The RSU 210 (or the server 201) may associate data corresponding to the newly received identification information to data corresponding to the prior received identification information. For example, the RSU 210 (or the server 201) may determine that the pedestrian 1610 carrying the electronic device 101, rather than crossing the road, has been staying on the side of the road for a relatively long time. The RSU 211 may receive the information and send out a communication signal 1622 containing the information to the vehicle 240 or 250. The vehicle 240 or 250 may determine the position of the pedestrian 1610 or maneuver to avoid the position of the pedestrian 1610 based on the information contained in the communication signal 1622.

According to an embodiment, a processor (e.g., the processor 120) may be configured to receive, from one or more first external vehicles through a communication module (e.g., the communication module 190 or the vehicle communication module 341), one or more pieces of first identification information and first data related to movement of the one or more first external vehicles, receive, from one or more second external vehicles through the communication module (e.g., the communication module 190 or the vehicle communication module 341), one or more pieces of second identification information and second data related to movement of the one or more second external vehicles a designated time period after receiving the first identification information and the first data, identify at least one piece of non-received identification information among the one or more pieces of first identification information, which is not included in the one or more pieces of second identification information, and at least one piece of newly received identification information among the one or more pieces of second identification information, which is not included in the first identification information, identify an external vehicle of which identification information is changed, the external vehicle corresponding to the at least one piece of non-received identification information, and the identifying is based at least on data corresponding to the at least one piece of newly received identification information among the second data and data corresponding to the at least one piece of non-received identification information among the first data, and associate data corresponding to the external vehicle of which identification information is changed among the first data and data corresponding to the external vehicle of which identification information is changed among the second data as data related to the movement of the external vehicle of which identification information is changed.

According to an embodiment, the processor (e.g., the processor 120) may be configured to determine the external vehicle as the external vehicle of which identification information is changed when a position determined based at least on the data corresponding to the at least one piece of newly received identification information falls within a position range determined based at least on the data corresponding to the at least one piece of non-received identification information.

According to an embodiment, as at least part of associating as the data related to the movement of the external vehicle of which identification information is changed, the processor (e.g., the processor 120) may be configured to associate the data corresponding to the external vehicle of which identification information is changed among the first data to the at least one piece of newly received identification information.

According to an embodiment, the processor (e.g., the processor 120) may be configured to provide, using a display (e.g., the display device 160), driving information regarding the first external vehicles and/or the second external vehicles based on, at least, parts of the first data or the second data.

According to an embodiment, the first data may include at least one of a position, a speed, and a heading of each of the first external vehicles, and the second data may include at least one of a position, a speed, and a heading of each of the second external vehicles. The processor (e.g., the processor 120) may be configured to compare at least one of the position, the speed, and the heading of each of the first external vehicles with at least one of the position, the speed, and the heading of each of the second external vehicles and identify the external vehicle of which identification information is changed based on, at least, a result of the comparison.

According to an embodiment, as at least part of associating as the data related to the movement of the external vehicle of which identification information is changed, the processor (e.g., the processor 120) may be configured to associate the data corresponding to the external vehicle of which identification information is changed among the first data and the data corresponding to the external vehicle of which identification information is changed among the second data to identification information corresponding to the external vehicle of which identification information is changed among the one or more pieces of second identification information.

According to an embodiment, the processor (e.g., the processor 120) may be configured to determine at least one mapping candidate among the first external vehicles and the second external vehicles and select the external vehicle of which identification information is changed among the at least one mapping candidate based on the newly received identification information.

According to an embodiment, the processor (e.g., the processor 120) may be configured to provide, through the display device 160, a first content indicating at least one of a position and a movement, at a first time, of an external electronic device, generated based on at least part of first data received along with first identification information from the external electronic device through the communication module (e.g., the communication module 190 or the vehicle communication module 341) and provide, through the display device 160, a second content indicating at least one of a position and a movement, at a second time, of the external electronic device, generated based on at least part of the first data and at least part of second data received along with second identification information, different from the first identification information, from the external electronic device through the communication module (e.g., the communication module 190 or the vehicle communication module 341).

According to an embodiment, the processor (e.g., the processor 120) may be configured to provide, through the display device 160, the first content including first additional information related to a state of the external electronic device determined based on at least part of the first data and a first graphic object indicating the external electronic device corresponding to the first identification information and provide, through the display device 160, the second content including second additional information related to another state of the external electronic device determined based on at least part of the second data, the at least part of the first data, and/or the first graphic object.

According to an embodiment, the first additional information may include first text indicating content identified based on at least part of the first data, and the second additional information may include second text indicating content identified based on the at least part of the second data and the at least part of the first data. At least part of the first text may be the same as at least part of the second text.

According to an embodiment, the first additional information may include a second graphic object generated based on at least part of the first data and displayed along with the first graphic object, and the second additional information may include a third graphic object generated based on at least part of the first data and at least part of the second data and displayed along with the first graphic object. An attribute of at least part of the second graphic object may be the same as an attribute of at least part of the third graphic object.

According to an embodiment, the processor (e.g., the processor 120) may be configured to provide, through the display device 160, the first content including the first graphic object indicating the external electronic device having an attribute determined based on at least part of the first data and provide, through the display device 160, the second content including the first graphic object indicating the external electronic device having an attribute determined based on at least part of the first data and at least part of the second data.

According to an embodiment, upon determining that a similarity between at least part of the second data and at least part of the first data meets a designated condition, the processor (e.g., the processor 120) may be configured to generate the second content based on at least part of the first data and at least part of the second data.

According to an embodiment, the processor (e.g., the processor 120) may be configured to determine a predicted position of the external electronic device based on, at least, a first position, a first speed, or a first heading included in the first data, and upon determining that a second position included in the second data corresponds to the predicted position, generate the second content based on at least part of the first data and at least part of the second data.

According to an embodiment, the processor (e.g., the processor 120) may be configured to determine a moving trend of the external electronic device based on, at least, the first data and information stored in association with the external electronic device corresponding to the first identification information before receiving the first identification information, and upon determining that a second position included in the second data corresponds to the moving trend, generate the second content based on at least part of the first data and at least part of the second data.

According to an embodiment, the processor (e.g., the processor 120) may be configured to receive, through the communication module (e.g., the communication module 190 or the vehicle communication module 341), a first communication signal including the first identification information and the first data or a second communication signal including the second identification information and the second data. The first communication signal or the second communication signal may be generated based on at least one of a basic safety message (BSM) and a personal safety message (PSM).

According to an embodiment, the processor (e.g., the processor 120) may be configured to transmit, through the communication module (e.g., the communication module 190 or the vehicle communication module 341), a communication signal including identification information and at least one of position and movement information about the electronic device 101, update the identification information in a designated default update period, and upon detecting an update period adjusting event, update the identification information in the update period corresponding to the update period adjusting event.

According to an embodiment, the processor (e.g., the processor 120) may be configured to update the identification information in a shorter period than the default update period upon determining that anonymity protection is required for the electronic device 101 and update the identification information in the default update period upon determining that no anonymity protection is required for the electronic device 101.

According to an embodiment, the processor (e.g., the processor 120) may be configured to update the identification information in a shorter period than the default update period upon determining that the speed of the electronic device 101 is a designated value or less and update the identification information in the default update period upon determining that the speed of the electronic device 101 exceeds the designated value.

According to an embodiment, the processor (e.g., the processor 120) may be configured to transmit, through the communication module (e.g., the communication module 190 or the vehicle communication module 341), a communication signal including identification information and at least one of position and movement information about the electronic device 101, update the identification information in a designated default update period, upon receiving a communication signal instructing to fix the identification information through the communication module (e.g., the communication module 190 or the vehicle communication module 341), stop updating the identification information, and upon receiving a communication signal to unfix the identification information through the communication module (e.g., the communication module 190 or the vehicle communication module 341), update the identification information in the designated default update period.

According to an embodiment, a method for operating an electronic device may comprise receiving, from one or more first external vehicles, one or more pieces of first identification information and first data related to movement of the one or more first external vehicles, receiving, from one or more second external vehicles, one or more pieces of second identification information and second data related to movement of the one or more second external vehicles a designated time period after receiving the first identification information and the first data, identifying at least one piece of non-received identification information among the one or more pieces of first identification information, which is not included in the one or more pieces of second identification information, and at least one piece of newly received identification information among the one or more pieces of second identification information, which is not included in the first identification information, identifying an external vehicle of which identification information is changed, the external vehicle corresponding to the at least one piece of non-received identification information, and the identifying is based on, at least, data corresponding to the at least one piece of newly received identification information among the second data and data corresponding to the at least one piece of non-received identification information among the first data, and associating data corresponding to the external vehicle of which identification information is changed among the first data and data corresponding to the external vehicle of which identification information is changed among the second data as data related to the movement of the external vehicle of which identification information is changed.

According to an embodiment, the method may comprise determining an external vehicle as the external vehicle of which identification information is changed when a position determined based on, at least, data corresponding to the at least one piece of newly received identification information falls within a position range determined based on, at least, data corresponding to the at least one piece of non-received identification information.

According to an embodiment, the method may comprise associating the data corresponding to the external vehicle of which identification information is changed among the first data to the at least one piece of newly received identification information.

According to an embodiment, the method may further comprise providing driving information regarding the first external vehicles and/or the second external vehicles based on, at least, parts of the first data or the second data.

According to an embodiment, the first data may include at least one of a position, a speed, and a heading of each of the first external vehicles, and the second data may include at least one of a position, a speed, and a heading of each of the second external vehicles. Identifying the external vehicle of which identification information is changed may include comparing at least one of the position, the speed, and the heading of each of the first external vehicles with at least one of the position, the speed, and the heading of each of the second external vehicles and identifying the external vehicle of which identification information is changed based on, at least, a result of the comparison.

According to an embodiment, as associating to the data related to the movement of the external vehicle of which identification information is changed the method may comprise associating the data corresponding to the external vehicle of which identification information is changed among the first data and the data corresponding to the external vehicle of which identification information is changed among the second data to identification information corresponding to the external vehicle of which identification information is changed among the one or more pieces of second identification information.

According to an embodiment, the method may further comprise determining at least one mapping candidate among the first external vehicles and the second external vehicles and selecting the external vehicle of which identification information is changed among the at least one mapping candidate based on the newly received identification information.

According to an embodiment, the method may comprise providing a first content indicating at least one of a position and a movement, at a first time, of an external electronic device, generated based on at least part of first data received along with first identification information from the external electronic device and providing a second content indicating at least one of a position and a movement, at a second time, of the external electronic device, generated based on at least part of the first data and at least part of second data received along with second identification information, different from the first identification information, from the external electronic device.

According to an embodiment, providing the first content may include providing the first content including first additional information related to a state of the external electronic device determined based on at least part of the first data and a first graphic object indicating the external electronic device corresponding to the first identification information, and providing the second content may include providing the second content including second additional information related to another state of the external electronic device determined based on at least part of the second data, the at least part of the first data, and the first graphic object.

According to an embodiment, the first additional information may include first text indicating content identified based on at least part of the first data, and the second additional information may include second text indicating content identified based on the at least part of the second data and the at least part of the first data. At least part of the first text may be the same as at least part of the second text.

According to an embodiment, the first additional information may include a second graphic object generated based on at least part of the first data and displayed along with the first graphic object, and the second additional information may include a third graphic object generated based on at least part of the first data and at least part of the second data and displayed along with the first graphic object. An attribute of at least part of the second graphic object may be the same as an attribute of at least part of the third graphic object.

According to an embodiment, providing the first content may include providing the first content including the first graphic object indicating the external electronic device having an attribute determined based on at least part of the first data, and providing the second content may include providing the second content including the first graphic object indicating the external electronic device having an attribute determined based on at least part of the first data and at least part of the second data.

According to an embodiment, providing the second content may include, upon determining that a similarity between at least part of the second data and at least part of the first data meets a designated condition, generating the second content based on at least part of the first data and at least part of the second data.

According to an embodiment, providing the second content may include determining a predicted position of the external electronic device based at least on, a first position, a first speed, or a first heading included in the first data, and upon determining that a second position included in the second data corresponds to the predicted position, generating the second content based on at least part of the first data and at least part of the second data.

According to an embodiment, providing the second content may include determining a moving trend of the external electronic device based at least on the first data and information stored in association with the external electronic device corresponding to the first identification information before receiving the first identification information, and upon determining that a second position included in the second data corresponds to the moving trend, generating the second content based on at least part of the first data and at least part of the second data.

According to an embodiment, the first communication signal including the first identification information and the first data or the second communication signal including the second identification information and the second data may be generated based on at least one of a basic safety message (BSM) and a personal safety message (PSM).

According to an embodiment, the method may comprise transmitting a communication signal including identification information and at least one of position and movement information about the electronic device, updating the identification information in a designated default update period, and upon detecting an update period adjusting event, updating the identification information in the update period corresponding to the update period adjusting event.

According to an embodiment, updating the identification information in the update period corresponding to the update period adjusting event may include updating the identification information in a shorter period than the default update period upon determining that anonymity protection is required for the electronic device and updating the identification information in the default update period upon determining that no anonymity protection is required for the electronic device.

According to an embodiment, updating the identification information in the update period corresponding to the update period adjusting event may include updating the identification information in a shorter period than the default update period upon determining that the speed of the electronic device is a designated value or less and updating the identification information in the default update period upon determining that the speed of the electronic device exceeds the designated value.

According to an embodiment, a method for operating an electronic device may comprise transmitting a communication signal including identification information and at least one of position and movement information about the electronic device, updating the identification information in a designated default update period, upon receiving a communication signal instructing to fix the identification information, stopping updating the identification information, and upon receiving a communication signal to unfix the identification information, updating the identification information in the designated default update period.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. The electronic device according to embodiments of the disclosure is not limited to those described above.

It should be appreciated that various embodiments of the present disclosure and the terms used therein are not intended to limit the techniques set forth herein to particular embodiments and that various changes, equivalents, and/or replacements therefor also fall within the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may refer to corresponding components without implying an order of importance, and are used merely to distinguish each component from the others without unduly limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a part thereof for performing one or more functions. For example, the module may be configured in an application-specific integrated circuit (ASIC).

Various embodiments as set forth herein may be implemented as software (e.g., the program 140) containing one or more instructions that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The one or more instructions may contain a code made by a compiler or a code executable by an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

According to an embodiment of the disclosure, there is provided a storage medium storing instructions that are executed by at least one processor to enable the at least one processor to perform at least one operation that may comprise receiving, from one or more first external vehicles, one or more pieces of first identification information and first data related to movement of the one or more first external vehicles, receiving, from one or more second external vehicles, one or more pieces of second identification information and second data related to movement of the one or more second external vehicles a designated time period after receiving the first identification information and the first data, identifying at least one piece of non-received identification information among the one or more pieces of first identification information, which is not included in the one or more pieces of second identification information, and at least one piece of newly received identification information among the one or more pieces of second identification information, which is not included in the first identification information, identifying an external vehicle of which identification information is changed, the external vehicle corresponding to the at least one piece of non-received identification information, and the identifying is based on, at least, data corresponding to the at least one piece of newly received identification information among the second data and data corresponding to the at least one piece of non-received identification information among the first data, and associating data corresponding to the external vehicle of which identification information is changed among the first data and data corresponding to the external vehicle of which identification information is changed among the second data as data related to the movement of the external vehicle of which identification information is changed.

According to an embodiment, the at least one operation may comprise providing a first content indicating at least one of a position and a movement, at a first time, of an external electronic device, generated based on at least part of first data received along with first identification information from the external electronic device and providing a second content indicating at least one of a position and a movement, at a second time, of the external electronic device, generated based on at least part of the first data and at least part of second data received along with second identification information, different from the first identification information, from the external electronic device.

The at least one operation may comprise transmitting a communication signal including identification information and at least one of position and movement information about the electronic device, updating the identification information in a designated default update period, and upon detecting an update period adjusting event, updating the identification information in the update period corresponding to the update period adjusting event.

The at least one operation may comprise transmitting a communication signal including identification information and at least one of position and movement information about the electronic device, updating the identification information in a designated default update period, upon receiving a communication signal instructing to fix the identification information, stopping updating the identification information, and upon receiving a communication signal to unfix the identification information, updating the identification information in the designated default update period.

As is apparent from the foregoing description, according to various embodiments of the disclosure, there may be provided an electronic device that, upon receiving identification information different from prior identification information that it received, determines that the received identification information and the prior identification information indicate the same object if a designated condition is met and a method for operating the electronic device. Therefore, despite changes in identification information, a particular object can be seamlessly managed for its driving.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
a communication module; and
a processor configured to:
receive, from one or more first external vehicles through the communication module, one or more pieces of first identification information and first data related to movement of the one or more first external vehicles;
receive, from one or more second external vehicles through the communication module, one or more pieces of second identification information and second data related to movement of the one or more second external vehicles a designated time period after receiving the first identification information and the first data;
identify at least one piece of non-received identification information among the one or more pieces of first identification information, which is not included in the one or more pieces of second identification information, and at least one piece of newly received identification information among the one or more pieces of second identification information, which is not included in the first identification information;
identify an external vehicle of which identification information is changed, among at least one external vehicle corresponding to the at least one piece of non-received identification information, and the identifying is based at least on data corresponding to the at least one piece of newly received identification information among the second data and data corresponding to the at least one piece of non-received identification information among the first data; and
associate data corresponding to the external vehicle of which identification information is changed among the first data and data corresponding to the external vehicle of which identification information is changed among the second data as data related to the movement of the external vehicle of which identification information is changed.

2. The electronic device of claim 1, wherein the processor is further configured to:
determine an external vehicle as the external vehicle of which identification information is changed when a position determined based at least on the data corresponding to the at least one piece of newly received identification information falls within a position range determined based at least on the data corresponding to the at least one piece of non-received identification information.

3. The electronic device of claim 1, wherein the processor is further configured to:
associate, as at least a part of associating as the data related to the movement of the external vehicle of which identification information is changed, the data corresponding to the external vehicle of which identification information is changed among the first data to identification information corresponding to the external vehicle of which identification information is changed among the at least one piece of newly received identification information.

4. The electronic device of claim 1, further comprising a display device,
wherein the processor is further configured to provide, using the display device, driving information regarding the first external vehicles and/or the second external vehicles based at least in part on the first data or the second data.

5. The electronic device of claim 1, wherein:
the first data includes at least one of a position, a speed, and a heading of each of the first external vehicles, and the second data includes at least one of a position, a speed, and a heading of each of the second external vehicles; and
the processor is further configured to:
compare at least one of the position, the speed, and the heading of each of the first external vehicles to at least one of the position, the speed, and the heading of each of the second external vehicles; and
identify the external vehicle of which identification information is changed based at least on a result of the comparison.

6. The electronic device of claim 1, wherein the processor is further configured to associate, as at least a part of associating as the data related to the movement of the external vehicle of which identification information is changed, the data corresponding to the external vehicle of which identification information is changed among the first data and the data corresponding to the external vehicle of which identification information is changed among the second data to identification information corresponding to the external vehicle of which identification information is changed among the one or more pieces of second identification information.

7. The electronic device of claim 1, wherein the processor is further configured to:
determine at least one mapping candidate among the first external vehicles; and
select, from among the at least one mapping candidate, the external vehicle of which identification information is changed, corresponding to the newly received identification information.

8. A method for operating an electronic device, the method comprising:
receiving, from one or more first external vehicles, one or more pieces of first identification information and first data related to movement of the one or more first external vehicles;
receiving, from one or more second external vehicles, one or more pieces of second identification information and second data related to movement of the one or more second external vehicles a designated time period after receiving the first identification information and the first data;
identifying at least one piece of non-received identification information among the one or more pieces of first identification information, which is not included in the one or more pieces of second identification information, and at least one piece of newly received identification information among the one or more pieces of second identification information, which is not included in the first identification information;
identifying an external vehicle of which identification information is changed, among at least one external vehicle corresponding to the at least one piece of non-received identification information, and the identifying is based at least on data corresponding to the at least one piece of newly received identification information among the second data and data corresponding to the at least one piece of non-received identification information among the first data; and associating data corresponding to the external vehicle of which identification information is changed among the first data and data corresponding to the external vehicle of which identification information is changed among the second data as data related to the movement of the external vehicle of which identification information is changed.

9. The method of claim 8, further comprising determining, as at least part of identifying the external vehicle of which identification information is changed among at least one external vehicle corresponding to the at least one piece of non-received identification information, an external vehicle as the external vehicle of which identification information is changed when a position determined based at least on the data corresponding to the at least one piece of newly received identification information falls within a position range determined based at least on the data corresponding to the at least one piece of non-received identification information.

10. The method of claim 8, further comprising associating, as at least a part of associating as the data related to the movement of the external vehicle of which identification information is changed, the data corresponding to the external vehicle of which identification information is changed among the first data to the at least one piece of newly received identification information.

11. The method of claim 8, further comprising providing driving information regarding the first external vehicles and/or the second external vehicles based at least in part on the first data or the second data.

* * * * *